June 14, 1932. G. C. HARTLEY ET AL 1,862,536
TANDEM TRUNK CIRCUITS
Filed Dec. 30, 1930  8 Sheets-Sheet 7

INVENTORS G. C. HARTLEY
E. P. G. WRIGHT
BY P. C. Smith
ATTORNEY

June 14, 1932.    G. C. HARTLEY ET AL    1,862,536
TANDEM TRUNK CIRCUITS
Filed Dec. 30, 1930    8 Sheets-Sheet 8

INVENTORS G. C. HARTLEY
E. P. G. WRIGHT
BY P. C. Smith
ATTORNEY

Patented June 14, 1932

1,862,536

UNITED STATES PATENT OFFICE

GEORGE CLIFFORD HARTLEY AND ESMOND PHILIP GOODWIN WRIGHT, OF LONDON, ENGLAND, ASSIGNORS TO WESTERN ELECTRIC COMPANY, INCORPORATED, OF NEW YORK, N. Y., A CORPORATION OF NEW YORK

TANDEM TRUNK CIRCUITS

Application filed December 30, 1930, Serial No. 505,516, and in Great Britain January 7, 1930.

This invention relates to automatic or semi-automatic telephone exchange systems and is more particularly concerned with tandem trunk circuits for use therein.

The object of this invention is to provide a simple yet efficient tandem trunk which combines the double function of transmitting impulses therethrough without repetition at the repeater and for causing the automatic operation of the calling subscriber's meter in accordance with the zone within which the called subscriber's station is located with respect to the calling station.

Tandem trunk circuits are necessary to provide hold conditions in trunking from three-wire trunks in an office to two-wire interoffice trunks and for this purpose it is necessary to provide talking battery operatively connected to an impedance circuit at the tandem trunk. Due to the presence of condensers in the usual tandem trunk talking circuit, such trunks in the past have been arranged to repeat impulses forward and to repeat back supervisory signals and the like.

With this object in view, one of the features of the present invention consists of a tandem trunk which comprises a condenser circuit, an alternative metallic circuit and signal responsive means which is adapted to control the insertion of either of said circuits in the talking connection, depending upon whether the tandem trunk is being prepared to transmit impulses or being prepared for the regular talking connection subsequent thereto.

According to another feature of the invention the tandem trunk is adapted to send back metering impulses in accordance with discriminating signals received from the impulse sender which holds the record of the destination of the call. A common metering circuit is provided which is associated with a plurality of tandem trunks and is adapted to receive a discriminating signal from the tandem trunk to which connection has been established to determine the number of impulses to be sent back therefrom to the meter of the calling station.

The features of this invention will be better understood from the following description of a telephone system in which the invention is applied. This system, which is shown diagrammatically in the drawings, is a controller by-path system equipped with a register-translator for use on certain classes of calls. It is understood, however, that modifications and other applications of the invention will readily occur to one skilled in the art.

Referring to the drawings.

Fig. 9 indicates how Figs. 1 to 8 are to be placed to from the complete system to which this description relates.

Figure 1:
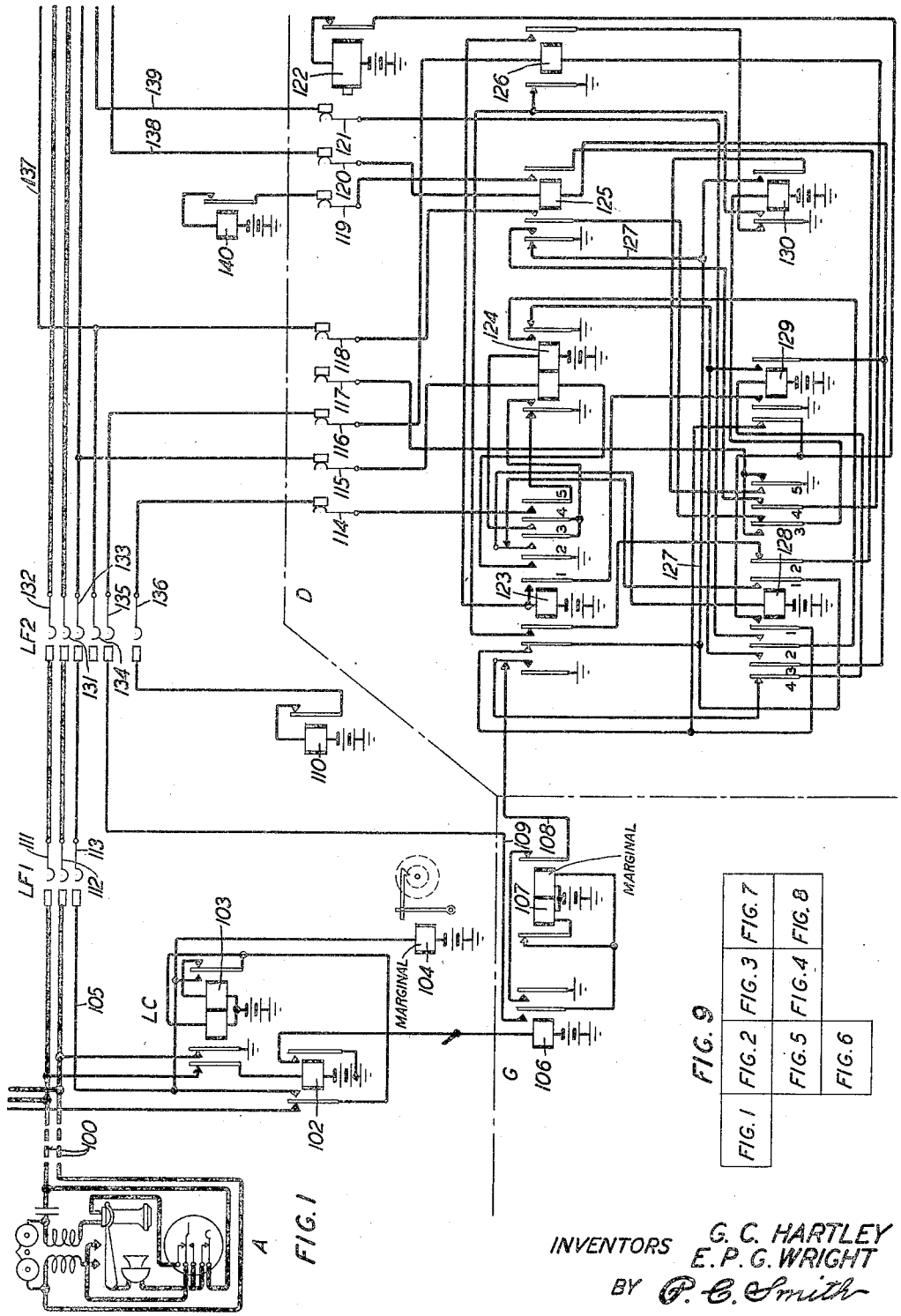
Fig. 1 shows a subscriber's station A and line circuit LC, a primary finder LF1, a secondary finder LF2, a group and start unit G, and a pre-selector D.
Figure 2:
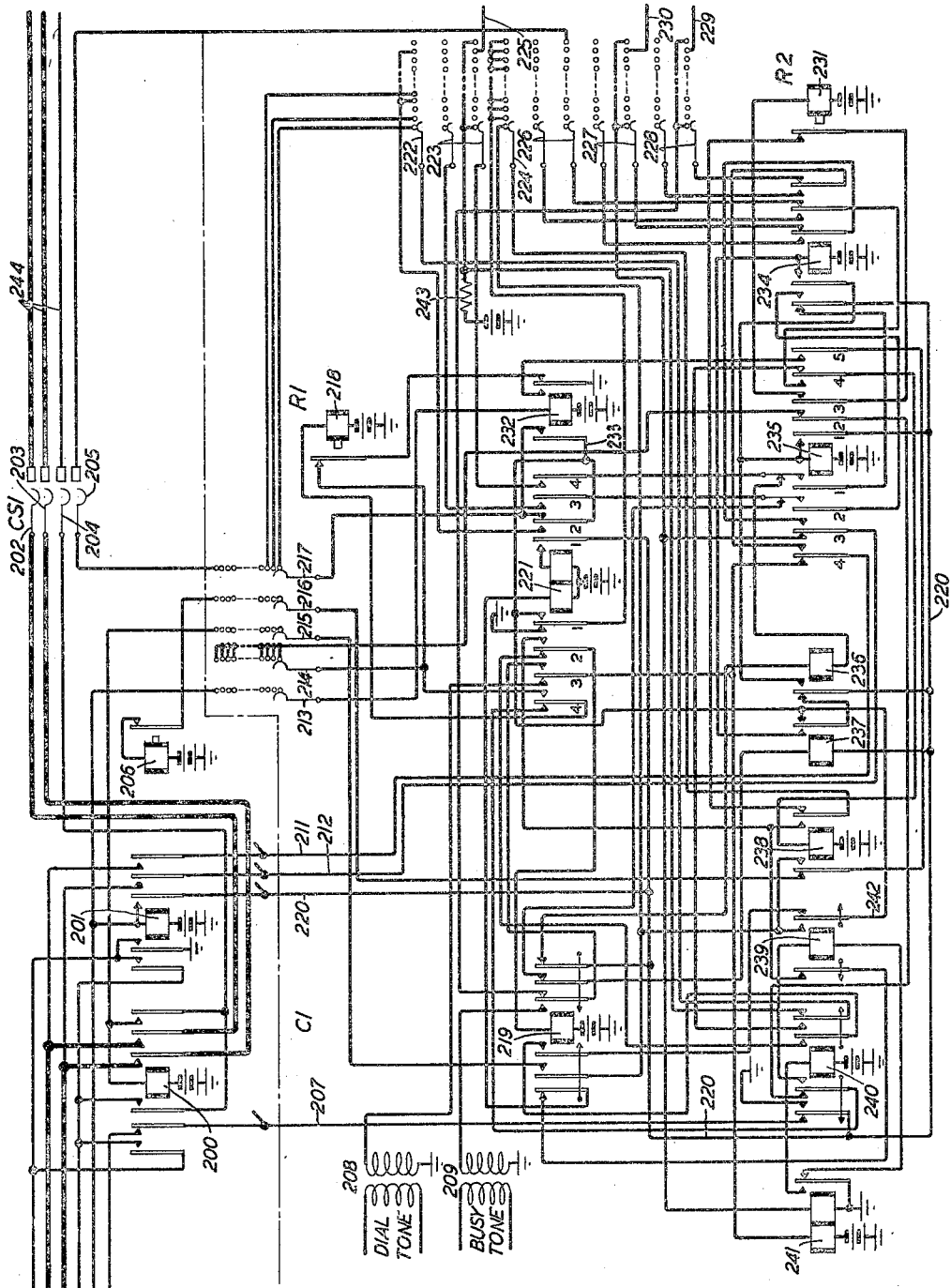
Fig. 2 shows a first selector stage comprising a conversational switch CS1 with which the secondary finder of Fig. 1 is permanently associated, and a by-path control unit C1 which is common to a group of conversational switches including the one shown. The conversational switch is separated from the control unit by the broken line.

Referring to Fig. 1, A represents a subscriber's station which is equipped with a subset of the usual type having a dial for use in automatically establishing telephone connections. The line from this station terminates at the exchange in a line circuit LC, in the banks of primary finders, such as LF1, and also in the banks of connector switches, which are not shown. The line circuit LC has the usual line and cut-off relays and includes as well a message register. The subscribers' lines are divided into groups and there are as many lines in a group as there are sets of terminals in the banks of the primary line finders. The primary finder switches comprise 100 point single-motion step-by-step switches of the no-normal type having two sets of wipers arranged 180° apart, each wiping over an arc of 50 terminals during one complete revolution of the switch shaft. The finder LF1 includes a stepping magnet 110 and the brushes numbered 111, 112 and 113 together with corresponding banks of terminals.

The lines in each group are multipled to the banks of as many primary finders as are required to handle the traffic from that group. A group unit G is associated with each group of lines; this unit includes a start relay 106 for starting an idle pre-selected secondary finder in search of a primary finder whenever a call is originated over any of the lines in the group.

The secondary finder switches are similar to the primary finder switches. The finder LF2 includes a stepping magnet 140 and brushes numbered 131 to 136 inclusive together with corresponding banks of terminals. The secondary finders are linked to conversational switches of a first selecting stage and are divided into groups each of sufficient size to handle the traffic which will be directed through them. Each secondary group is arranged to search for a different primary finder in each of the primary groups. Associated with each group of secondary finders is an allotting and controlling switch D which pre-selects an idle secondary finder linked with a first stage selector, and having an associated control circuit which is also idle. Preferably, therefore, the number of pre-selecting switches is equal to the number of groups of secondary finders and to the number of primary finders in each group. The pre-selector D, which includes the stepping magnet 122 and the brushes numbered 114 to 121, inclusive, together with corresponding terminal banks, is also a single-motion step-by-step switch having no-normal position.

When a subscriber originates a call, the starting relay in the associated group circuit marks all the primary finders serving the group in which the call originates, and starts a set of secondary finders, which have been pre-selected by the switches D, in search of an idle primary finder. These secondary finders hunt until two of them have reached marked primary finders; and those two primary finders then hunt until one of them finds the calling line.

The conversational switch CS1 of the first selecting stage is a 100 point single-motion step-by-step switch having a stepping magnet 206 and wipers 202 to 205, inclusive, together with corresponding banks of terminals. The control unit C1 comprises a control switch R1, a by-path switch R2 and an associated group of relays. The control switch R1 is a 50 point step-by-step single-motion switch, the terminals of which are strapped so that in one complete revolution of the switch there are as many cycles of operation as the capacity of the switch permits; this switch includes the stepping magnet 218 and wipers numbered 213 to 217, inclusive, together with the corresponding banks of terminals. The by-path switch R2 is a 100 point single-motion step-by-step switch having a stepping magnet 231 and wipers numbered 222 to 228, inclusive, together with the corresponding terminal banks. There are two sets each of the wipers designated 223, 226, 227 and 228, both sets being effective to simultaneously wipe over corresponding banks of terminals. Certain groups of positions of the switch R1 are used to effect a marking in the bank of the by-path switch R2, the terminals of these positions of the bank cooperating with brush 217 being connected as required to the terminals in the control bank cooperating with brush 222 of switch R2. Other groups of positions of switch R1 are used for operatively connecting the control circuit with a particular conversational switch to which a calling line has been extended, and through which the control circuit may receive impulses created by the operation of the dial at the calling subscriber's station; the terminals in these positions of the marking bank cooperating with brushes 224 are multipled to corresponding terminals in the marking bank cooperating with brush 205 of all conversational switches served by the control unit C1. Outgoing talking conductors extend from the banks cooperating with brushes 202 and 203 to the conversational switches of the succeeding switching stage. Corresponding line and test conductors extend from the bank cooperating with brushes 228, 227 and 223 of by-path switch R2 to the switches of the succeeding switching stage. Holding conductors extend from the terminals in the bank cooperating with brush 204 of switch CS1 to the conversational switches of the succeeding switching stage.

The control switch R1 is advanced under control of the impulses created by the dialing of the first digit of the called number to a corresponding position; whereupon the by-path switch R2 is advanced to the group of path switch R2 thus marked in the banks cooperating with brushes 226. The switch R2 is then advanced automatically to select a set of terminals in the marked group, the test terminal of which is connected through an idle conversational switch of the succeeding selecting stage to an idle control unit. The incoming impulse conductors are thus immediately extended through brushes 228 and 227 to the succeeding by-path control circuit. The switch R1 is then again advanced until it finds the terminals of the conversational switch of the first selecting stage to which the calling line is connected; whereupon switch CS1 is advanced until its test brush 205 makes contact with the marked terminal corresponding to the set of terminals selected by the by-path switch R2. Both the control and conversational connections are thus extended to the succeeding selecting stage.

Figure 3:
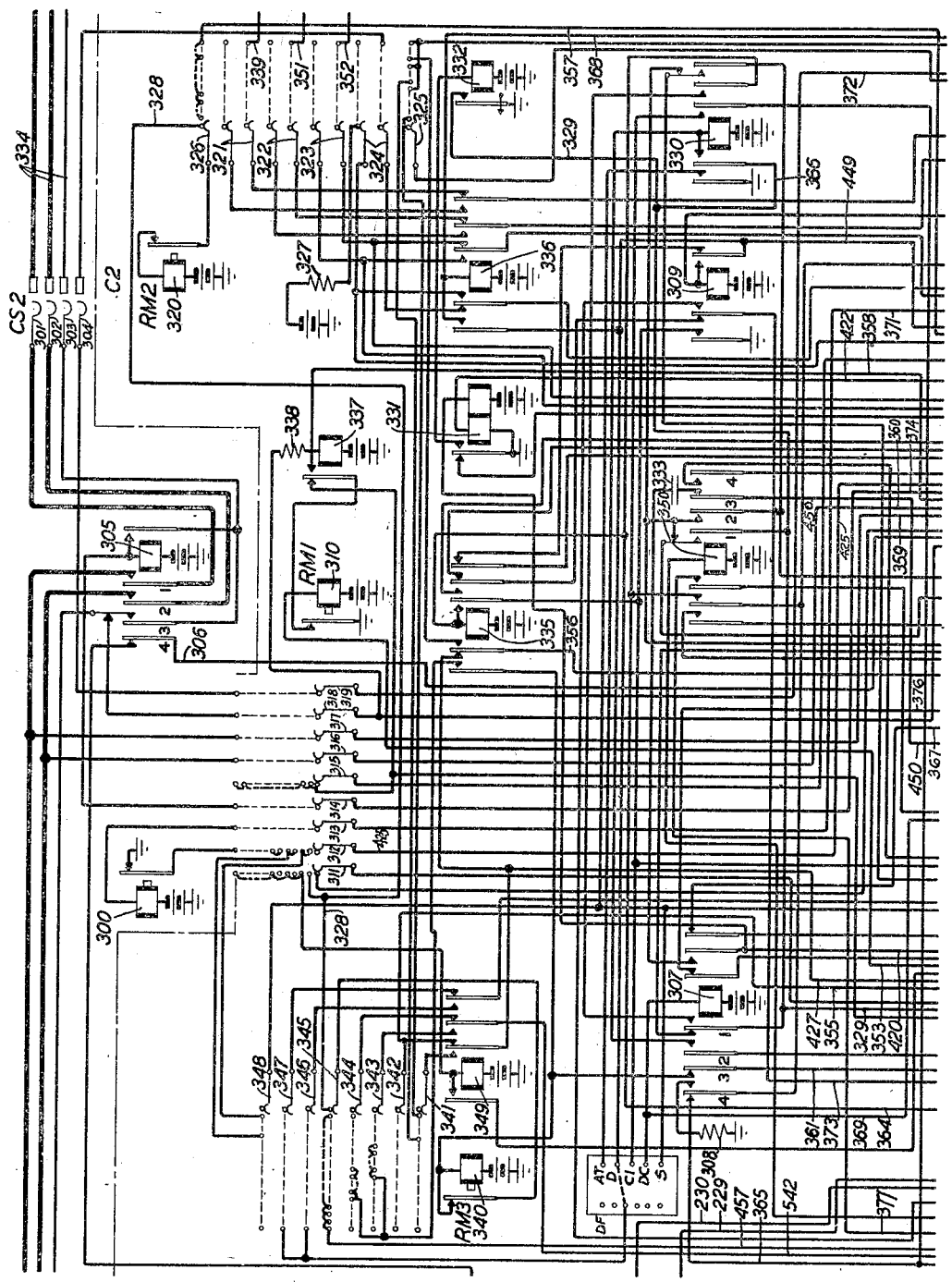
Figs. 3 and 4 show a second selector stage comprising a conversational switch CS2 and a second stage by-path control unit C2 which is common to a group of switches including the switch CS2. The broken line separates the conversational switch from the common control unit.
Figure 4:
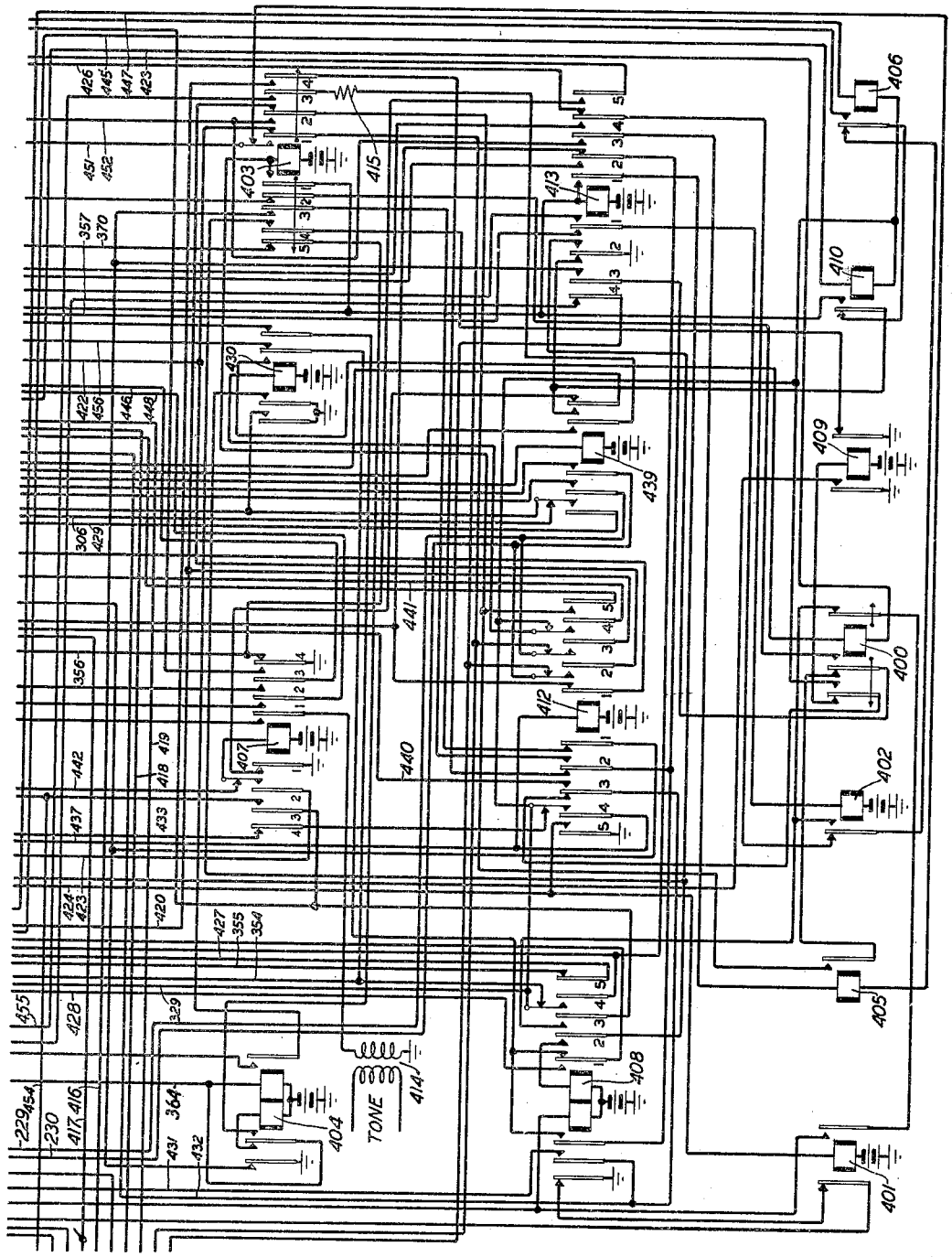

The conversational switch CS2 of the second selecting stage, shown in Fig. 3, is similar to the switch CS1 of the first selecting stage; it includes the stepping magnet 300 and the brushes 301, 302, 303 and 304 together with corresponding banks. The control unit C2 shown in Figs. 3 and 4 includes the control switches RM1 and RM3, and the by-path switch RM2. The control switch RM1 is similar to the control switch R1 of the first selecting stage; it includes the stepping magnet 310 and the brushes numbered 311 to 319 inclusive, together with corresponding banks of terminals. The by-path switch RM2 is similar to the by-path switch R2 of the first selecting stage; it includes the stepping magnet 320 and the brushes numbered 321 to 326, inclusive, together with corresponding banks of terminals. The control switch RM3 is similar to the by-path switch RM2; it includes the stepping magnet 340 and the brushes numbered 341 to 348, inclusive, together with corresponding banks of terminals.

Figure 5:
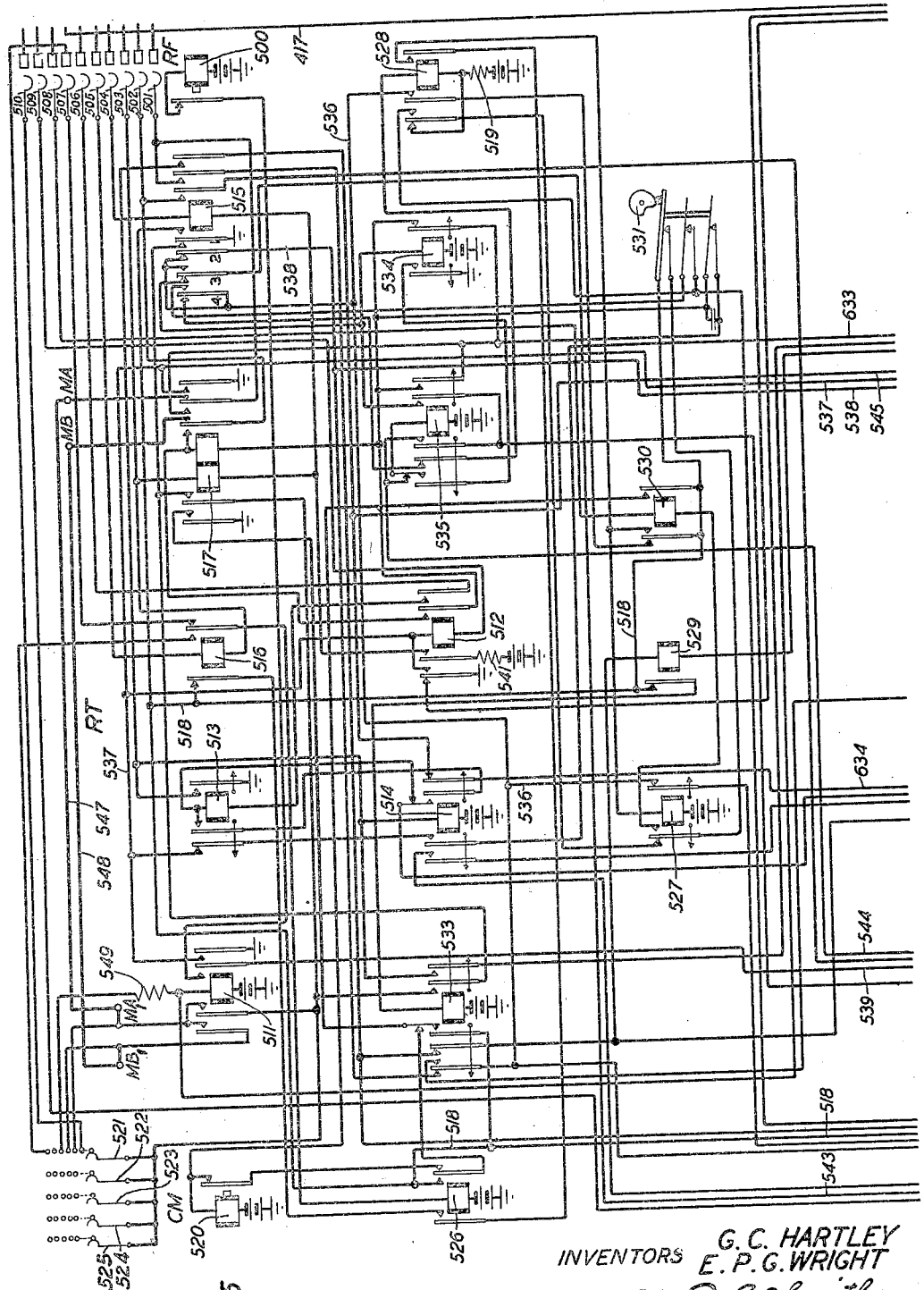
Figs. 5 and 6 show a register-translator unit RT which is common to a plurality of second stage control units including the unit C2.
Figure 6:
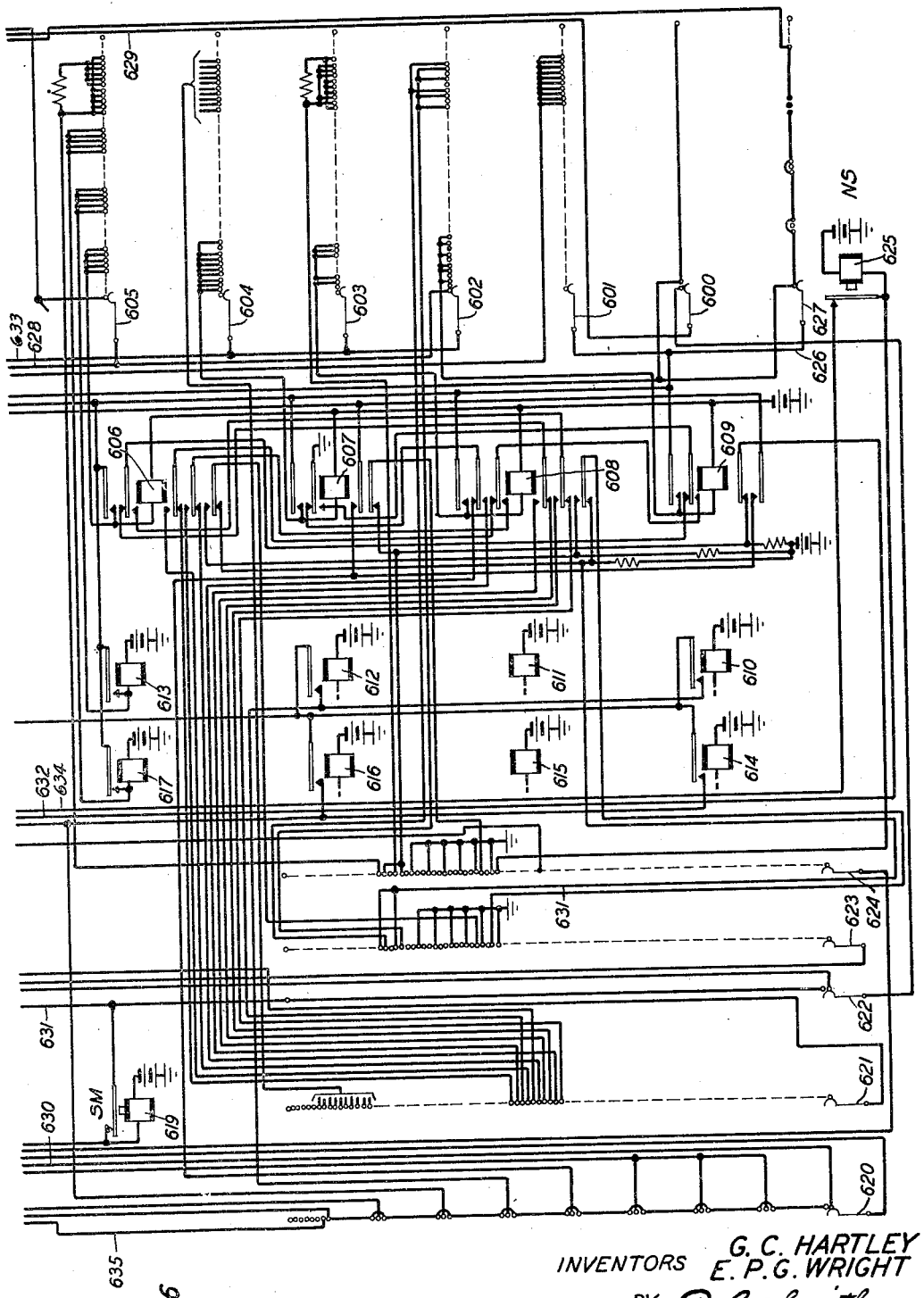

The register-translator unit RT, shown in Figs. 5 and 6, includes a finder switch RF by means of which the register-translator may be connected to any one of the group of second stage control units with which it is associated. It also includes a code switch CM, a numerical switch NS, three sets of register relays, and a sending switch SM. The finder switch RF is a single-motion step-by-step switch having no home position; it has a stepping magnet 500 and brushes numbered 501 to 510, inclusive, together with corresponding banks of terminals. The code switch CM is a single-motion step-by-step switch having a normal position; it has a stepping magnet 520 and brushes numbered 521 to 525, inclusive, together with corresponding banks of terminals. The numerical switch NS is a single-motion step-by-step switch having a normal position; it has a stepping magnet 625 and brushes numbered 600, 601, 602, 603, 604 and 605 together with corresponding banks of terminals. There are three sets of register relays numbered respectively from 606 to 609, inclusive, from 610 to 613, inclusive, and from 614 to 617, inclusive. These sets register, respectively, the thousands, hundreds, and tens digits of a called number in accordance with corresponding advances of the numerical switch NS. The units digit of a called number is registered by the numerical switch and does not need to be transferred since all of the dial impulses have been received. The sender switch SM is a single-motion step-by-step switch having a normal position; it has a stepping magnet 619 and brushes numbered 620 to 624, inclusive, together with corresponding banks of terminals.

The second stage control unit receives the second and third digits of the office code, and during receipt of the third digit a starting signal is extended to a number of register-translators causing their various finder switches RF to search for the control unit from which the starting signal was received. The second office code digit is stored by switch RM3 under control of switch RM1 and the by-path switch RM2 selects the corresponding outgoing trunk group under control of switch RM3. Switch RM2 then automatically selects an idle set of terminals in this group, the test terminal of which leads to a conversational switch or tandem trunk of the succeeding selecting stage. The third office code digit is also stored by the RM3 switch.

If the call is a local call the register-translator is released as soon as the connection is extended through the by-path switch RM2 to a succeeding local selecting stage. If the call is an interoffice call reached over direct trunks and an idle trunk is immediately available, the register-translator is also released as soon as the connection is extended through the by-path switch RM2; but if an idle trunk is not found before the next digit is dialed, the numerical digits are stored in the register-translator and retransmitted by its sending switch to complete the connection. If the call is one which may be completed over alternative routes,—that is, either over a direct trunk selected by the by-path switch RM2 or over a trunk selected at the intermediate outgoing selecting stage, the register-translator is released as an outgoing direct trunk is immediately available. But, if all direct trunks are busy, the office code digits are retransmitted by the control unit C2 to the register-translator at the same time that the numerical impulses are being received; the control unit C2 then operates to advance the by-path switch RM1 to a corresponding group of terminals connected to an intermediate outgoing selecting stage, and the completion of the connection is controlled by the register-translator. If the call is one which is completed only through the intermediate selecting stage the office code and numerical digits are received by the register-translator and the by-path switch RM2 advances to the group of terminals leading to the intermediate selecting stage. If the call is one which is completed through a tandem office, the intermediate selecting stage is effective to select the group of trunks which leads to this tandem office, although the impulses transmitted by the register-translator to control this selection are varied in accordance with the particular called office to be reached through the tandem point.

Figure 7:
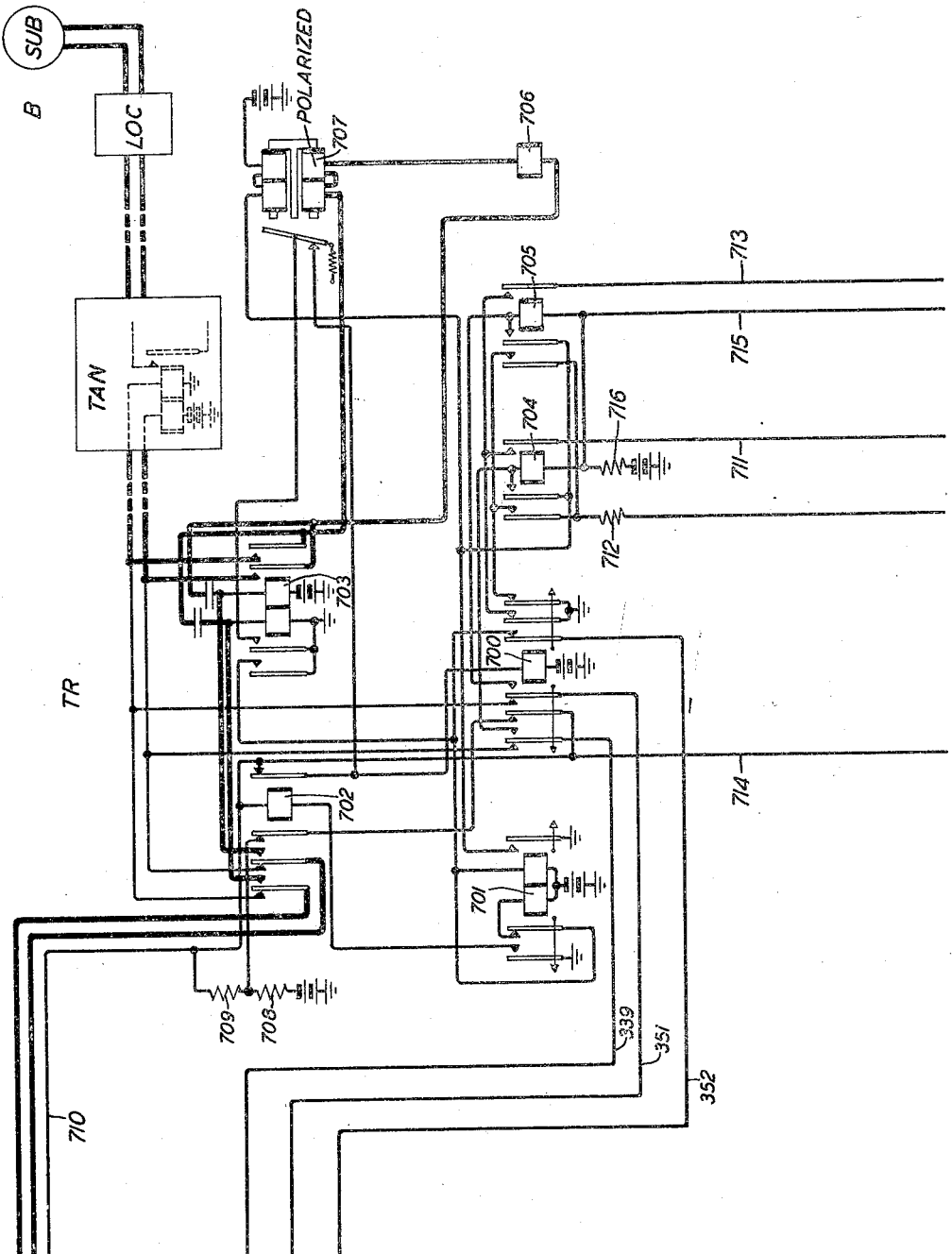
Fig. 7 shows an outgoing tandem trunk TR which is the subject of this invention and is adapted for use on calls to tandem offices.

The outgoing tandem trunk TR shown in Fig. 7 transmits the impulses sent out from the register-translator RT over the outgoing trunk to the distant office. The distant office may be equipped with any of the well known types of automatic telephone apparatus which responds to incoming trains of impulses corresponding to the number of the called station.

Figure 8:
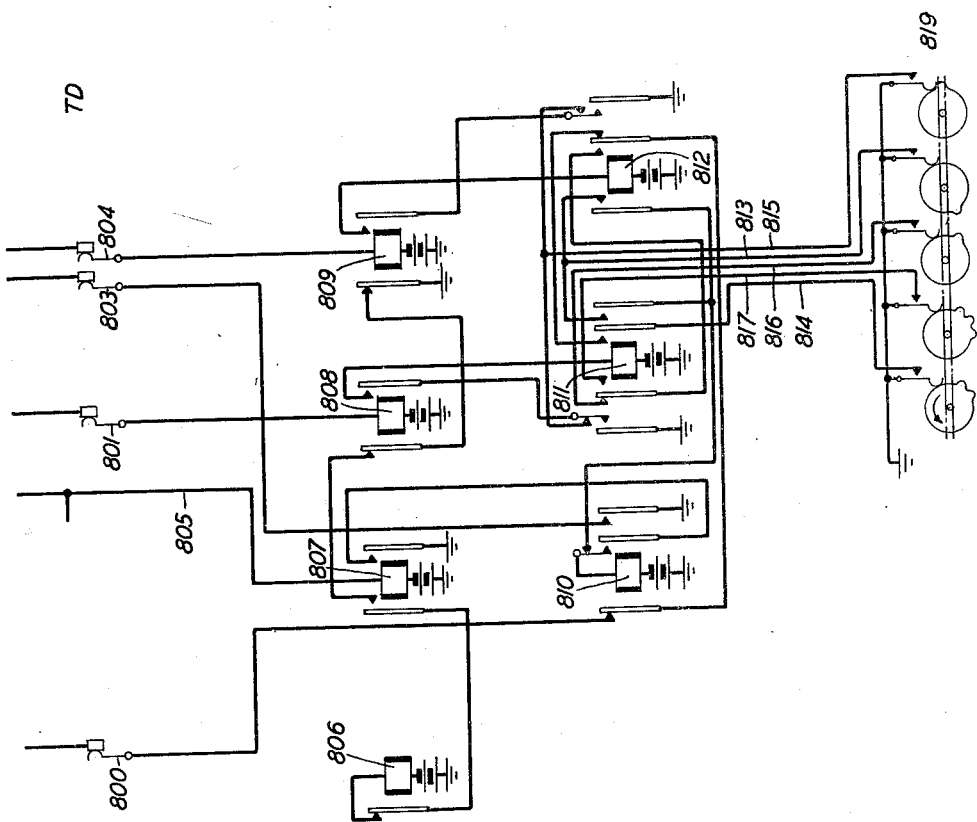
Fig. 8 shows the common translating device or metering circuit which is associated with a plurality of different tandem trunks.

The translating device TD shown in Fig. 8 is a switch comprising a magnet 806 and a group of brushes 800 to 804, inclusive. The terminal banks of this switch are connected to a group of tandem trunks which are associated with various routes and upon a signal from a register-translating device, switch 806 operates to find the calling repeater and connect to its terminals on the bank the switch brushes 800 to 804, inclusive. Upon receipt of a signal from the repeater to which connection has been made the circuit of translating device TD in cooperation with an interrupter INT serve to transmit impulses back to the calling subscriber's meter in accordance with the charge to be registered for the call as more completely described hereinafter.

The selecting stages for completing a local call or for completing calls which do not make use of the intermediate selecting stage are not involved in the description of this invention and therefore are not illustrated in the drawings. For the same reason reference to the operation of the second selecting stage and register-translator on these types of calls will be omitted, as far as possible.

The operation of the system shown in Figs. 1 to 8, inclusive, will now be described.

When the subscriber at station A removes the receiver to originate a call, an obvious circuit is closed over line 100 for operating the line relay 102. Relay 102 connects over its left front contacts the left winding of the cut-off relay 103 over conductor 105 to mark the sleeve terminal of the line 100 in the banks of the associated group of primary line-finder switches. Relay 102 also closes a circuit over its right contacts for operating the start relay 106 in group circuit G. Relay 106 operates and connects the windings of relay 107 over conductor 109 to the marking terminal in the banks of all secondary finders in the associated secondary group. Start relay 106 also connects ground at its outer contacts, through the right back contacts of relay 107, left outer normally made contacts of relay 123, No. 4 contacts of relay 128, winding of relay 129 to battery. Relay 129 is the start relay of an idle distributor switch D. Relay 129 operates and closes a circuit for operating relay 125, from ground at the right back contacts of relay 124, right contacts of relay 129, winding of relay 125, brush 120 and cooperating terminal of distributor switch D, over conductor 138, left back contacts of relay 200, over conductor 207 to the common control unit C1, through the outer left back contacts of relay 240, conductor 220, back contacts of relays 236 and 237, conductor 242, No. 2 back contacts of relay 221, brush 217 and normal contacts of switch R1, normal terminal and brush 222 of switch R2, right back contacts of relay 240, through resistance 243 to battery. As soon as this circuit is closed, the drop in potential across resistance 243 is sufficient to prevent the selection of any conversational switch in the associated group by a pre-selector, similar to D, which is hunting for an idle secondary finder as hereinafter described. Relay 125 closes a circuit from battery through the winding and interrupter contacts of the stepping magnet 140 of switch LF2, brush 119 and cooperating terminal, right contacts of relay 125, right back contacts of relay 128, left inner back contacts of relay 123, to ground at the back contacts of relay 126. Thus relay 126 and the corresponding relay of each of the distributor switches which is connected to an idle secondary line-finder, the control circuit of which is idle, close the energizing circuits for the stepping magnets of the associated secondary line-finder switches. Relay 125 also connects ground through its outer left front contacts, the right No. 4 back contacts of relay 128, winding of test relay 126, and through brush 116 of the distributor switch D to brush 135 of the secondary line-finder switch with which the pre-selector D is connected.

The secondary line-finder LF2 is advanced under control of the stepping magnet 140 from one group of terminals to the next until the brush 135 reaches the marking terminal to which conductor 109 is multipled whereupon test relay 126 in the distributor circuit D is operated over a circuit completed from ground on the contacts of relay 125 over a path previously traced to brush 135 and cooperating terminal, conductor 109, inner contacts of relay 106, right winding of relay 107 to battery. Relay 126 operates and opens the circuit through the winding of the stepping magnet 140 of line-finder LF2 and closes a circuit for operating relay 123 to ground at the back contacts of relay 130. Relay 123 locks through its No. 1 contacts to ground on the left inner contacts of relay 129 and disconnects group conductor 108 from the winding of relay 129. Relay 129, however, is held operated to the ground at the left outer front contacts of relay 123. Relay 107 of the group circuit will not operate in series with the single test relay 126, but when a secondary finder controlled by another distributor switch also engages the marked primary finder, there will be two test relays 129 in parallel and relay 107 will operate and disconnect its left hand winding from conductor 109 so as to prevent the test relays in other pre-selectors from operating. When relay 107 operates it opens the operating circuit of the start relays of the remaining distributor switches in the group to prevent further hunting on the part of the remainder of the secondary finders. It is apparent, therefore, that the secondary finders continue to hunt until two of them have seized primary finders of the group having access to the calling line.

If the secondary finder stops on the terminals of a primary finder which is already engaged, the relay 130 operates in a circuit which may be traced from battery through its winding, right No. 3 back contacts of relay 128, inner left front contacts of relay 125, brush 118 of the distributor switch D, brush 134 of finder LF2, terminal of the busy primary line-finder, through the multiple wiring to the corresponding terminal in the bank of another secondary line-finder which has already established connection with this primary finder, over a conductor corresponding to conductor 137 to ground at the front contact of the relay corresponding to relay 201 in the conversational circuit associated with this other secondary finder. Relay 130 operates, holds the circuit for relay 123 open, and closes an alternative circuit for the stepping magnet 140 independent of relay 126 so that the secondary finder switch continues to advance. A primary finder will be taken into use, however, if it is idle even if it is standing on a busy line, since in this case the brush 134 will not be connected to ground at a busy conversational switch.

The aforementioned operation of relay 123 also closes a circuit for the stepping magnet 110 of the primary finder LF1. This circuit may be traced from battery through the winding and interrupter contacts of magnet 110, terminal and brush 136 of line-finder LF2, terminal and brush of bank 114 of the distributor switch D, through the No. 5 contacts of relay 123, to ground at the left back contacts of relay 124. When one of the two hunting primary finders engages the terminals of the calling line, a circuit is closed from battery through the windings of cut-off relay 103, in parallel with the winding of the message register 104, over conductor 105, through the terminal and brush 113 of line-finder LF1, terminal and brush 133 of line-finder LF2, terminal and brush 115 of distributor switch D, through the left winding of relay 124 to ground at the No. 2 contacts of relay 123. Relays 103 and 124 are operated by the current in this circuit but the message register 104 is marginal and does not operate at this time. Cut-off relay 103 releases line relay 102 by disconnecting its winding from the line 100. Relay 102, in turn, causes the release of relay 106 unless this relay is held operated due to the origination of a call over one or more of the other lines in the group. Relay 124 locks in a circuit from battery through its right winding, No. 4 contacts of relay 123, to ground at the left front contacts of relay 124. Relay 124 opens the circuit for operating the stepping magnet 110 of the primary finder LF1, opens the circuit through the winding of relay 125, and closes a circuit from battery through the winding of relay 128, No. 3 front contacts of 123 to ground at the left front contacts of relay 124. The primary finder LF1 is thus stopped on the terminals of the calling line, relay 125 releases, and relay 128 operates. Relay 128 opens the circuits through the windings of relays 129 and 126 to cause their release; and relay 129 cannot thereafter reoperate if the origination of another call in the same group should cause ground to be reconnected to conductor 108. Relay 129 opens the circuit through the winding of relay 123; and with relays 125 and 123 released, relay 128 is held operated through the normally closed contacts of the No. 3 contact set of relay 123, right No. 1 contacts of relay 128, conductor 127 to ground at the back contact of relay 125. The release of relay 123 causes the release of relay 124. Relay 128 closes a circuit for operating relay 201 of the conversational switch CS1 associated with the secondary line-finder used in extending this connection; this circuit may be traced from battery through the winding of relay 201, over conductor 139, through the terminal and brush of bank 121 of distributor switch D, and through the left No. 2 contacts of relay 128 to ground at the right front contacts of relay 124 prior to the release of relay 124, relay 201 holding up after the release of relay 124 over a locking circuit hereinafter traced.

The aforementioned release of relay 125 closed a circuit from battery through the winding and interrupter contacts of stepping magnet 122 of distributor switch D, through the left No. 1 contacts of relay 128, left middle back contacts of relay 123, over conductor 127 to ground at the left back contacts of relay 125. The distributor switch D is thereby advanced to preselect the idle secondary finder whose control circuit is also idle in readiness for the next call. When the terminals of such a secondary finder are reached, relay 125 operates in a circuit from ground at the right back contacts of relay 124, left No. 3 contacts of relay 128, winding of relay 125, brush 120 and cooperating terminal of switch D, over conductor 138 through the back contacts of relay 200 of the associated conversational circuit, over conductor 207 to the associated control circuit, and thence to battery in a similar manner to that hereinbefore described for the operation of relay 125 upon the origination of a call over line 100. Relay 125 opens the circuit for stepping magnet 140 and opens the locking circuit for relay 128. The release of relay 128 in turn causes the release of relay 125. Should the distributor switch D engage a secondary finder which, although idle, has been pre-selected by another distributor switch, relay 130 is operated before relay 128 releases, in a circuit from battery through the winding of relay 130, right No. 3 front contacts of relay 128, brush 117 and selected terminal of bank through the brush 117 of the pre-selector which has already selected this secondary finder, to ground at the outer right back contact of the relay which corresponds to relay 128. Relay 130 connects ground from the right No. 5 front contacts of relay 128 through the right front contact of relay 130 to conductor 127 to hold relay 128 operated and thus continue stepping the pre-selector brushes past this terminal. Relays 125 and 130 release when the brushes are advanced so that the pre-selector continues to hunt until another idle secondary finder is reached.

The aforementioned operation of relay 201 extends the connection from the calling line 100, through brushes 111 and 112 of primary finder LF1 and brushes 132 and 131 of secondary finder LF2, right outer front contacts of relay 201, conductors 211 and 212, No. 4 and No. 3 back contacts, respectively, of relay 235, to the windings of impulse relay 241 of the control unit C1. Relay 241 operates thereby and closes an obvious circuit for operating relay 240. Relay 201 also connects ground through its left-hand front contacts, through brush 133 of line-finder LF2 and brush 113 of line-finder LF1 to hold the cut-off relay 103 of the calling subscriber's line operated, and thus prevent release of the connection. Relay 240 connects ground at its outer left front contacts to conductor 220, thereby locking relay 201 through its winding and right inner front contacts. Relay 240 also opens, at its left outer back contacts, the test circuit over conductor 207 and through resistance 243, so as to prevent the seizure of any other conversational switch associated with the control unit C1. Relay 238 now operates in a circuit which may be traced from battery through its winding, right No. 4 back contacts of relay 235, right outer front contacts of relay 240, brush 222 and normal terminal of the bank of switch R2, normal terminal and brush 217 of switch R1, No. 2 back contacts of relay 221, conductor 233, back contacts of relays 237 and 236, conductor 220 to ground at the left outer front contacts of relay 240. The secondary winding of transformer 208 is connected through the middle left back contacts of relay 221, in parallel with the left-hand winding of relay 241 so that dial tone is transmitted to the calling subscriber's station as an indication that dialing of the number to be called may begin.

When the calling subscriber dials the first digit, relay 241 alternately releases and reoperates each time the line circuit is opened and closed at the dial contacts. Relay 240 is a slow-to-release relay and remains operated during the receipt of the entire train of impulses. The release of relay 241 closes a circuit from battery through the winding of magnet 218 of switch R1, left outer back contacts of relay 221, left inner front contacts of relay 240, winding of relay 239 to ground at the right back contacts of relay 241. Magnet 218 and relay 239 both operate in this circuit. Relay 239 is also a slow-to-release relay and holds operated during receipt of the entire train of impulses. The reoperation of relay 241 causes the release of magnet 218, thereby advancing the switch R1 into position 2. Relay 238 releases when the brushes of switch R1 advance from position 1, the normal position. Each release and reoperation of relay 241 thus causes the operation and release of magnet 218 thereby advancing the brushes of switch R1 to a position which corresponds to the digit dialed.

The aforementioned release of relay 238, when the brushes of switch R1 are advanced from position 1 to position 2, closes a circuit from battery through the winding of stepping magnet 231 of switch R2, middle right back contacts of relay 235, interrupter contacts of magnet 231, right back contacts of relay 238, brush 224 and normal terminal of the cooperating terminal bank in switch R2, front contacts of relay 239, and through the back contacts of relays 237 and 236, conductor 220, to ground on the left outer front contacts of relay 240. When magnet 231 operates, the circuit through its winding is opened at its interrupter contacts, and magnet 231 releases, thereby advancing the brushes of switch R2 to position 2. With switch R2 in any position other than its normal position the connection from the winding of magnet 231 to brush 224 is extended through the off-normal terminals of the cooperating terminal bank to ground at the No. 1 back contacts of relay 221. Switch R2 is thereafter advanced under control of its own interrupter contacts until relay 238 reoperates as hereinafter described. The terminals in the bank cooperating with brush 217 of switch R1 are connected to the terminals in the bank cooperating with brush 222 of switch R2 in such a manner that the circuit for reoperating relay 238 is completed whenever the R2 switch reaches the beginning of the group which corresponds to that on which the R1 switch is standing after all of the impulses created by the dialing of the first digit have been received. The circuit for reoperating relay 238 may be traced from battery through its winding, right No. 4 back contacts of relay 235, right outer front contacts of relay 240, brush 222 and cooperating terminal of switch R2, the corresponding terminal and brush 217 of switch R1, No. 2 back contacts of relay 221, conductor 233, through the back contacts of relay 237 and 236, conductor 220 to ground on the left outer front contacts of relay 240. When relay 238 reoperates in this circuit, it opens the circuit for operating magnet 231 to stop the brushes of switch R2 on the first set of terminals in a group which corresponds to the first digit dialed by the calling subscriber.

The reoperation of relay 238 closes a circuit for operating relay 221; this circuit may be traced from battery through the left winding of relay 221, left outer back contacts of relay 219, left back contacts of relay 239, right front contacts of relay 238, brush 224, and cooperating terminal on bank R2, to ground at the No. 1 back contacts of relay 221. Relay 221 closes a locking circuit through its right winding and No. 1 front contacts to ground over conductor 220 before the circuit through its left winding is opened at its No. 1 back contacts. The operation of relay 221 causes the release of relay 238 and connects the windings of test relays 236 and 237 to test brushes 223. If the first set of terminals of the selected group are idle, one or both of test relays 236 and 237 operate, depending upon which of the brushes 223 is in contact with an idle set of terminals. The circuit for operating relay 236 may be traced from ground on conductor 220, through the right outer back contacts of relay 219, winding of relay 236, left No. 1 normally made contacts of relay 235, No. 4 front contacts of relay 221, lower brush 223 and first terminal in the selected group, over conductor 225, No. 4 back contacts of relay 305 of the selected conversational switch CS2 in the next switching stage, conductor 306 to the associated control unit C2, through the left outer normally made contacts of relay 439, normal terminal and brush 311 of switch RM1, right outer back contact of relay 430, upper brush 324 and the normal terminal of the corresponding bank of switch RM2, through resistance 327 to battery. The circuit for operating relay 237 may be traced from ground on conductor 220 through the winding of relay 237, middle right back contacts of relay 219 No. 2 normally made contacts of relay 235, No. 3 contacts of relay 221, through the upper one of test brushes 223 and the first terminal of the selected group, thence over a conductor similar to conductor 225, to battery in a control unit in the same manner as already traced for the operation of test relay 236. The operation of either or both relays 236 and 237 prevents the further advance of the brushes of switch R2 since the circuit for operating magnet 231 passes through the back contacts of both of these relays. If the first sets of terminals in the selected group are busy, stepping-magnet 231 is reoperated in a circuit which may be traced from battery through its winding, middle right No. 3 back contacts of relay 235, interrupter contacts of magnet 231, right back contact of relay 238, brush 224 and cooperating terminal No. 1 front contacts of relay 221, conductor 233, through the back contacts of relays 237 and 236 to ground on conductor 220. The brushes of switch R2 are thus advanced until an idle set of terminals is reached and either or both of relays 236 and 237 operate or until the brushes reach the last set of terminals in the selected group. If relay 236 operates it closes an obvious circuit for operating relay 235, and relay 235 locks through its right No. 1 front contacts to ground on conductor 220. If relay 237 operates, and relay 236 is not operated, it closes an obvious circuit for operating relay 234, and relay 234 closes an obvious circuit for operating relay 235. Relay 235 locks to ground on conductor 220; and relay 234 is locked through its inner left front contacts and the right No. 1 front contact of relay 235 to the same ground. Relay 234 controls the connections to brushes 228, 227 and 226 to render either the upper or lower of these brushes effective, to the exclusion of the others, depending upon whether the selected set of terminals is located in the upper or lower of the corresponding banks. In the following description it will be assumed that the selected terminals are located in the lower banks cooperating with brushes 228, 227 and 226 so that relay 234 is not operated. Test relays 236 and 237 are released by relay 235 after it has locked operated.

If all of the terminals of the selected group are busy, a circuit is closed from battery through the winding of relay 238, right No. 4 back contacts of relay 235, outer right front contacts of relay 240, brush 222 and last terminal in the selected group of cooperating bank R2, No. 2 front contacts if relay 221, conductor 233, back contacts of relays 237 and 236, to ground on conductor 220. Relay 238 operates in this circuit to prevent the further operation of stepping magnet 231. Relay 238 closes a circuit from battery through the winding of relay 219, left inner front contacts of relay 221, right front contacts of relay 238, brush 224 and off-normal terminals of cooperating bank, No. 1 front contacts of relay 221, over conductor 233, and thence to ground as hereinbefore traced. Relay 219 is a slow-to-operate relay so that it will not operate in this circuit during the intervals that both relays 238 and 221 were operated at the time of the initial operation of relay 221; but on the last set of terminals in a group the circuit for relay 219 is maintained so that relay 219 eventually operates and connects busy tone through the secondary winding of transformer 209, right inner front contacts of relay 219, No. 3 left front contacts of relay 221 through the left winding of relay 241, so that the all-trunks-busy signal is transmitted to the calling subscriber.

The aforementioned operation of relay 221, at the time of the completion of group selection by switch R2, was also effective to close a circuit for operating stepping magnet 218 of switch R1 so as to advance the brushes of switch R1 into engagement with the set of terminals through which it is connected to the conversational switch CS1. The circuit for operating magnet 218 may be traced from battery through its winding, through the outer left front contacts of relay 221, interrupter contacts of magnet 218 to ground at the back contact of relay 232. The stepping magnet 218 is therefore alternately operated and released and the brushes of switch R1 are advanced one step by each release of the magnet 218. When brush 213 makes contact with the terminal associated with switch CS1, relay 232 operates in a circuit which is traced from battery through its winding, brush 213 and cooperating terminal of bank, right inner front contact of relay 201, over conductor 220 to ground at the left outer front contacts of relay 240.

With relays 232 and 237 both operated (due to the fact that the R2 switch has found an idle set of terminals in the required group, and that the control unit C1 is connected through the brushes of switch R1 to the conversational switch CS1), a circuit is completed for operating the stepping magnet 206 of the conversational switch CS1; this circuit is traced from battery through the winding and interrupter contacts of magnet 206, terminal and brush 216 of bank of switch R1, left back contact of relay 238, and through the No. 5 contacts of relay 235 to ground at the right front contacts of relay 232. Relay 232 also connects the ground on conductor 220 through the back contacts of relays 236 and 237, conductor 233, left front contacts of relay 232, and through the brush 217 and cooperating terminal to the test brush 205 of switch CS1. Magnet 206 advances the brushes of switch CS1 until the test brush 205 comes into contact with the terminal in its bank which is connected to the terminal of the selected set in the bank associated with brush 226 of switch R2, thereby extending the ground on test brush 205 through brush 226, the middle right back contacts of relay 234, and through the No. 4 front contacts of relay 235, to the winding of relay 238. Relay 238 operates, thereby opening the circuit for operating the stepping magnet 206 so as to stop the brushes of switch CS1 on the terminals of the outgoing conversational switch which was previously selected by the by-path switch R2. Relay 238 closes a circuit for operating relay 219; this circuit is traced from battery through the winding of relay 219, left inner front contacts of relay 221, right front contacts of relay 238, brush 224 and cooperating terminal of bank of switch R2, No. 1 front contact of relay 221, conductor 242, back contacts of relays 237 and 236, to the ground on conductor 220. Relay 219 closes a circuit from battery through the winding of relay 200 of conversational circuit CS1, terminal and brush 215 of switch R1, left middle contacts of relay 219, left front contacts of relay 238, right No. 5 front contact of relay 235, to ground at the left front contact of relay 232. Relay 200 locks through its right outer and inner left front contacts and through the outer left front contacts of relay 201 to ground at the inner left contacts of relay 201. Relay 200 extends the talking connection from brushes 132 and 131 of line-finder LF2, through its inner right front contacts, through brushes 202 and 203 of switch CS1, over trunk 244 to the conversational switch CS2. It also extends the ground at the inner left contacts of relay 201, through the left outer front contacts of relay 201 and the left inner front contacts of relay 200, through brush 204 of switch CS1 over the sleeve conductor of trunk 244 to mark the associated conversational switch CS2 in the bank cooperating with brush 318 of switch RM1 in the control unit C2.

The aforementioned operation of relay 235, after switch R2 finds an idle set of terminals in the selected group is effective to disconnect the windings of line relay 241 from the calling line and to extend the connections from the calling line through its left No. 3 and 4 contacts, the right outer and inner back contacts, respectively, of relay 234, through the lower brushes 228 and 227 and the selected terminals of switch R2, conductors 229 and 230, to the control unit C2 of the succeeding selecting stage. Relay 235 also extends conductor 220 through the left back contacts of relay 234, the left No. 1 front contacts of relay 235, the right No. 4 contacts of relay 221, lower brush 223 and cooperating terminal, conductor 225 to the control unit C2. Relays 241 and 240 release in consequence of the operation of relay 235, but relays 201, 221 and 235 (also 234, if operated) are held operated by ground connected to conductor 225 as is hereinafter explained. Impulses created by the dialing of succeeding digits of the called number are, therefore, transmitted through control unit C1 to control unit C2, until the control unit C2 disconnects this ground from conductor 225, at which time relays 201, 221 and 235 are released. Relay 200 is held operated through its right outer front contacts and brush 204 of switch CS1, over the sleeve conductor of trunk 244 to ground in control unit C2 as is hereinafter described. The release of relay 201 causes the successive release of relays 232 and 238 and the release of relay 232 closes a circuit for advancing the R1 switch to normal. The circuit for operating stepping magnet 218 is traced from battery through its winding, left No. 4 back contact of relay 221, left inner back contacts of relay 240, right No. 2 contacts of relay 235, brush 214 and a cooperating off-normal terminal of switch R1, interrupter contacts of magnet 218 to ground at the back contact of relay 232. The release of relay 238 closes a circuit for advancing the switch R2 to normal; this circuit is traced from battery through the winding of stepping magnet 231, right No. 3 contacts of relay 235, interrupter contacts of magnet 231, right back contacts of relay 238, brush 224 and cooperating off-normal terminals, to ground at the No. 1 back contacts of relay 221. With both of switches R1 and R2 in their normal positions, the control unit C1 is made available for use with another of the associated conversational switches since the test conductor 207 is now again connected through resistance 243 to battery.

When the connection from the calling line is extended through brushes 228 and 227 of switch R2 of control unit C1, line relay 331 of control unit C2 is operated in a circuit which may be traced from battery through the right winding of this relay, conductor 420, No. 2 back contacts of relay 403, right No. 3 normally made contacts of relay 412, over conductor 229, through the contact cooperating with lower brush 228 of switch R2 in control unit C1, outer right back contact of relay 234, left No. 4 front contacts of relay 235, conductor 211, outer right contacts of relay 201, brush 132 of line-finder LF2, brush 111 of line-finder LF1, line 100 and the calling subscriber's sub-set, brush 112 of line-finder LF1, brush 131 of line-finder LF2, right middle front contacts of relay 201, conductor 212, left No. 3 front contacts of relay 235, right inner back contacts of relay 234, through the lower brush 227 and cooperating terminal of switch R2, conductor 230, right No. 2 normally made contacts of relay 412, right No. 1 back contacts of relay 403, conductor 422, left winding of relay 331 to ground. Relay 331 closes an obvious circuit for operating the slow-to-release relay 332. Relay 332 closes a circuit for operating relay 430, from battery through the winding of relay 430, right No. 4 normally made contacts of relay 412, over conductor 329, to ground at the front contact of relay 332. Relay 430 opens the aforementioned test circuit through the brush 324 and normal terminal of bank of RM2 and connects ground through its left outer front contact, the left outer normally made contacts of relay 439, conductor 306, the No. 4 contacts of relay 305, over test conductor 225, terminal and lower brush 223 of switch R2 of control unit C1, right No. 4 front contacts of relay 221, left No. 1 front contacts of relay 235, left outer back contacts of relay 234 to holding conductor 220 of control unit C1; this ground is effective to prevent the release of relays 200, 201, 232, 238, 221 and 235 as hereinbefore mentioned.

When the calling subscriber dials the second digit, this being one of the digits of the office code, line relay 331 of control unit C2 is alternately released and reoperated as many times as its operating circuit is opened by the contacts of the dial. The release of relay 331 closes a circuit for operating the stepping magnet 310 of switch RM1 and relay 400; this circuit is traced from battery through the winding of stepping magnet 310, conductor 353, No. 1 back contacts of relay 408, right inner front contacts of relay 430, winding of relay 400, to ground at the back contact of relay 331. When relay 331 reoperates, the stepping magnet 310 releases but relay 400 is a slow-to-release relay and remains operated until all of the impulses corresponding to the second digit have been received. Since relay 332 is also a slow-to-release relay it remains operated during receipt of this train of impulses. The brushes of switch RM1 are thereby advanced by the alternate operation and release of magnet 310 to a position which corresponds to the second digit dialed by the calling subscriber.

When the switch RM1 reaches position 2, a circuit is closed for operating the stepping magnet 340 of switch RM3; this circuit is traced from battery through the winding and interrupter contacts of magnet 340, brush 345 and normal associated terminal, conductor 328, through the second terminal of bank cooperating with brush 311 of switch RM1, conductor 354, No. 4 normally made contacts of relay 408, over conductor 329 to ground at the front contact of relay 332. Stepping magnet 320 of switch RM2 is also operated when the brushes of switch RM1 enter position 2, since the winding of magnet 320 is then connected through its interrupter contacts and through the brush 326 and cooperating normal terminal, conductor 328 to the second terminal cooperating with brush 311 of switch RM1. The release of magnets 340 and 320 when their circuits are opened by their own interrupter springs causes the advance of switches RM2 and RM3 from their normal position to position 2. The terminals of bank cooperating with brush 312 of switch RM1 are connected in pairs to the terminals of bank cooperating with brush 348 of switch RM3; to illustrate, terminals 2 and 3 of bank cooperating with brush 312 are connected to terminal 2 of bank cooperating with brush 348, and terminals 4 and 5 of bank cooperating with brush 312 are connected to terminal 12 of bank cooperating with brush 348. When, therefore, the brushes of switch RM3 are advanced to position 2, a circuit is completed from battery through the winding of relay 401, conductor 424, brush 348 and terminal 2, through terminal 2 or 3 and brush 312, conductor 425, right back contacts of relay 439, to ground at the left inner back contacts of relay 407. In operating, relay 401 prevents the closing of another operating circuit for the stepping magnet 340 so that switch RM3 remains in position 2 until switch RM1 has advanced beyond position 3. If, and when the brushes of switch RM1 are advanced beyond position 3 in response to impulses received by line relay 331, relay 401 releases, and the circuit for operating magnet 340 to cause the further advance of switch RM3 is traced from battery through the winding and interrupter contacts of magnet 340, brush and off-normal terminals of bank 345, conductor 457, back contacts of relay 457 to ground on the left back contacts of relay 408. When the brushes of switch RM3 reach position 12, the circuit for operating 401 is again closed, and the operation of relay 401 prevents the further advance of switch RM3 until the brushes of switch RM1 have been advanced beyond position 5. The stopping positions 2, 12, 22, etc. of switch RM3 represent the first terminals of different routing groups in the banks cooperating with brushes 341 and 342, respectively. The first and succeeding terminals of each group of terminals of these banks are connected to the first terminal of a corresponding group of terminals in bank cooperating with brush 325 of switch RM2. The first terminal of each group in this bank is thus continuously marked while the brushes 341 and 342 are engaging the corresponding terminals in their respective banks. This arrangement prevents the advance of switch RM2 beyond the first terminal of the group marked by switch RM3. The winding of relay 349 is connected to terminals 3, 5, 7, 9, and 11 of the bank cooperating with brush 311 of switch RM1 so that this relay is operated, through brush 311 in each of these positions, to the ground on conductor 329, but the operation of relay 349 during the receipt of the impulses created by the dialing of the second digit is without effect since at this time brush 342 is continuously connected through the right outer back contact of relay 408 and the left back contact of relay 335, to ground at the right outer back contacts of relay 407.

Having advanced from normal to position 2 the further advance of switch RM2 is controlled by relay 402, this relay being connected to operate when brush 325 of switch RM2 engages the terminal marked by brushes 341 and 342 of switch RM3. The circuit for operating relay 402 may be traced from battery through its winding, No. 4 back contacts of relay 413, conductor 426, brush 325 and marked terminal on cooperating bank of switch RM2, terminal and brush bank cooperating with brushes 341 and 342, through the left inner front contact of relay 349 or conductor 355, No. 5 back contacts of relay 408, conductor 427, and through the left back contacts of relay 335, to ground at No. 4 back contacts of relay 407. The circuit for operating magnet 320, after the brushes of switch RM2 have been advanced to position 2, may be traced from battery through its winding and interrupter contacts, brush 326 and off-normal terminals of the cooperating bank, conductor 357, left No. 1 back contacts of relay 413, back contacts of relay 402, 406 and 410, to ground at the left No. 2 back contacts of relay 413. If and when the brushes of switch RM3 are advanced beyond the first group, as controlled by the setting of switch RM1, the stepping magnet 320 of switch RM2 will be again energized due to the release of relay 402; and the brushes of switch RM2 will be advanced until they engage the next terminal which is marked by brush 341 or brush 342 of switch RM3, at which time relay 402 reoperates in the circuit hereinbefore traced. With both of relays 401 and 402 operated and with relay 400 released when the impulses of the second digit cease, a circuit is completed for operating relay 408. This circuit may be traced from battery through the left winding of relay 408, front contacts of relay 401, right back contacts of relay 400, front contact of relay 402, back contacts of relays 406 and 410, to ground at left No. 2 back contacts of relay 413. Relay 408 closes a locking circuit through its right winding and No. 2 front contacts, to ground at the left inner front contact of relay 430. Relay 408 opens the circuit for operating magnet 340 of switch RM3, disconnects the back contact of relay 331 from the magnet 310 of switch RM1 and connects the back contact of relay 331 to magnet 340 of switch RM3 in readiness for storing the next train of dial impulses.

If switch RM1 stopped in one of positions 3, 5, 7, 9 or 11 so that relay 349 is operated and if the circuit for operating relay 402 passed through the brush and bank 342 instead of brush and bank 341, relay 402 releases when relay 408 operates and relay 349 is locked through its right front contact and the right outer front contact of relay 408, to ground on conductor 329. The release of relay 402 again closes the circuit for operating magnet 320 of switch RM2 so as to advance the brushes of this switch until they reach the terminal which is marked by brush 341 instead of brush 342 of switch RM3. Relay 402 then reoperates to stop further advance of switch RM2. Thus relay 349 controls the marking circuit through brushes 341 and 342 depending upon the first digit dialed. In the following description we will assume relay 349 to be normal so that brushes 342, 344 and 347 are operatively effective to the exclusion of brushes 341, 343, and 346.

To sum up the operation due to the dialing of the second office code digit, switch RM1 is advanced to a position which corresponds to the number of impulses received. Switch RM3 is thereby advanced to a corresponding routing group in order to mark a group terminal in the bank of switch RM2. Switch RM2 is thereupon advanced under control of switch RM3 to the first terminal of a group which leads toward the office or offices indicated by the second office code digit. Relay 401 operates when switch RM3 has been advanced to the terminal marked by switch RM1 and relay 402 operates when switch RM2 has been advanced to the terminal marked by switch RM3.

The aforementioned operation of relay 408 also closes a circuit for operating stepping magnet 310 of switch RM1 to advance the brushes of this switch to connect with conversational switch CS2; this circuit may be traced from battery through the winding of magnet 310, conductor 353, No. 1 front contacts of relay 408, conductor 428, back contact of test relay 337, and interrupter contacts of magnet 310 to ground. The brushes of switch RM1 are thereby advanced by the alternate operation and release of magnet 310 until the terminals associated with the conversation switch CS2 are reached, at which time a circuit is completed for operating test relay 337. Relay 401 releases when switch RM1 advances. The circuit for operating test relay 337 may be traced from battery through the winding of relay 337, resistance 338, brush 318 and cooperating terminal, No. 3 normally made contacts of relay 305, over the holding conductor of trunk 244, through the terminal and brush 204 of switch CS1, the left inner front contacts of relay 201 to ground. Relay 337 opens the operating circuit for magnet 310 thereby preventing the further advance of switch RM1. Relay 337 also closes an obvious circuit over conductor 358 for operating relay 439 opening test conductor 306 and connecting ground from the outer left front contact of relay 430 through the left outer front contact of relay 439, conductor 429, through the brush 318 and cooperating terminal, No. 3 back contacts of the continuity springs of relay 305 over the sleeve conductor of trunk 244, through brush 204 of switch CS1 and the right outer front contact of relay 200 to the winding of relay 200 to hold this relay operated after relay 201 is released. Relays 201, 232, 238, 221 and 235 of the second selecting stage release when the ground over conductor 225 is thus disconnected by the operation of relay 439 from conductor 220 of control unit C1, thereby causing the return of this control unit to normal as hereinbefore described. The impulsing circuit from line 100 is now traced through the outer right front contacts of relay 200, brushes 202 and 203 of conversational switch CS1, over the talking conductors of trunk 244, through the brushes 316 and 317 and cooperating treminals of switch RM1, conductors 359 and 360 respectively, the left front contacts of relay 439, the right No. 2 and 3, back contacts of the continuity contacts of relay 412, and through the No. 2 and 3 back contacts of relay 403 to the windings of line relay 331.

When the calling subscriber dials the next digit (the third digit of the office code), relay 331 is alternately released and reoperated in response to the impulses thus created. The first release of relay 331 closes a circuit for operating magnet 340 of switch RM3 and slow-to-release relay 400; this circuit may be traced from battery through the winding of magnet 340, No. 3 back contacts of relay 307, conductor 361, left No. 4 back contacts of relay 413, left No. 2 back contact of relay 412, inner left front contact of relay 408, right front contact of relay 430, winding of relay 400, conductor 423, to ground at the back contact of relay 331. The operation of relay 400 closes a circuit for operating relay 350; this circuit may be traced from battery through the winding of relay 350, conductor 431, left outer front contact of relay 408, left No. 3 back contacts of relay 412, left outer front contact of relay 400 to ground on conductor 329. Relay 350 locks in a circuit from battery through its winding, conductor 431, the left outer front contact of relay 408, conductor 432, right No. 4 front contact of relay 350, conductor 433, left No. 4 back contact of relay 407, and through the left No. 4 normally closed contacts of relay 412, to the ground on conductor 329. Relay 350 sends a starting signal to all of the register-translators associated with the control unit C2 by connecting the ground at the outer back contact of relay 404, through the left outer front contact of relay 350, to conductor 417. Relay 350 also connects battery through the windings of relay 404, conductor 364, the middle left front contact of relay 350, No. 4 back contacts of relay 307, conductor 365, to the test terminal associated with control unit C2 in the bank of contacts cooperating with brush 509 of translator RT and the corresponding terminals in the banks of the other associated register-translators.

The alternate operation and release of magnet 340, in response to the impulses received by relay 331 from the dialing of the third digit, causes the advance of the brushes of switch RM3 to a corresponding terminal in the previously selected routing group. When relay 400 releases after all of the impulses corresponding to the third digit have been received, a circuit is closed for operating relay 409; this circuit is traced from battery through the winding of relay 409, outer left back contacts of relay 400, to ground on conductor 329 as hereinbefore described. Relay 409 connects ground through its front contact, conductor 435, the left outer back contact of relay 349, brush 347 and cooperating terminal corresponding to the third code digit, to a terminal on the distributing frame DF. The terminals in the banks cooperating with brushes 346 and 347 of switch RM3 are connected at the distributing frame DF to terminals designated S, DC, CI, D, AT, respectively. Terminals in banks cooperating with brushes 346 and 347 which do not represent any assigned office code are cross-connected at distributing frame DF to terminal DC; terminals which represent offices reached by trunks directly accessible to switch RM2, including local trunks for completing calls to subscribers in the same office as the calling subscriber, are cross-connected at frame DF to terminal S; terminals, which represent offices reached over call indicator trunks to which switch RM2 has direct access, are cross-connected at frame DF to terminal CI; terminals which represent offices reached over trunks directly accessible to switch RM2 and also reached over trunks leading to a tandem office in case all of the direct trunks are busy, are cross-connected at frame DF to terminal AT; and terminals, which represent offices reached only over trunks to tandem offices, are cross-connected at frame DF to terminal D. The operation of relay 409 is thus effective on calls for unassigned codes to cause the operation of relay 307, on calls completed over direct trunks only to cause the operation of relay 401, on calls completed over call indicator trunks to cause the operation of relay 412, on calls completed over direct trunks and also over tandem trunks to cause the operation of relay 330, and on calls completed only over tandem trunks to cause the operation of relay 335. Since we are only concerned with a call completed over a tandem trunk, we will assume that the terminal with which brush 347 is in contact is cross-connected through frame DF to terminal D so that the operation of relay 409 causes the operation of relay 335; and further reference to the operation of this system on other classes of calls will be omitted as far as possible without detracting from the clarity of the description of this invention.

With relay 335 operated, the winding of relay 412 is connected through the right inner front contact of relay 335 by way of conductor 437 in parallel with the winding of relay 335, so that relay 412 operates, and the ground connected from the right back contact of relay 407, conductor 356 to the left inner armature of relay 335 is disconnected from brush 342 and is connected to the first terminal of a group in the bank cooperating with brush 325 of switch RM2, all of the terminals in this group being connected to trunks connected with the tandem repeater shown in Fig. 7. Relay 402 releases when the ground is disconnected from brush 342 thereby closing the circuit hereinbefore traced for operating stepping magnet 320 of switch RM2. The brushes of switch RM2 are advanced until brush 325 makes contact with the first terminal of the group outgoing to the distant office by way of the tandem repeater trunks, at which time relay 402 re-operates to open the circuit for magnet 320. The circuit for operating relay 402 is traced from battery through its winding, right No. 4 back contacts of relay 413, conductor 426, brush 325 and cooperating terminal, left inner front contact of relay 335, conductor 356 to ground at the right No. 4 back contact of relay 407. The aforementioned operation of relay 412, releases relay 409, closes an obvious circuit for re-operating relay 401, and closes circuits for holding relays 430 and 350 operated. The winding of relay 350 is connected through the outer left-hand contact of relay 408 by way of conductor 431, left No. 3 front contact of relay 412, conductor 440 and through the left No. 1 back contact of relay 307, to ground on conductor 329; and the winding of relay 430 is connected through the right No. 4 front contact of relay 412, conductor 441, and the No. 1 front contact of relay 350 to ground on conductor 329. With both of relays 401 and 402 operated a circuit is closed from battery through the winding and left No. 2 continuity contacts of relay 407, conductor 442, left inner front contact of relay 350, conductor 377, front contact of relay 401, right back contact of relay 400, front contact of relay 402, back contacts of relays 406 and 410, to ground at the left No. 2 back contact of relay 413. Relay 407 operates and locks through the front contact of its left No. 2 contact set, conductor 423, back contact of the continuity contacts of relay 330, right No. 2 back contact of relay 413, No. 4 front contact of relay 408, to ground on conductor 329.

If either or both of the first sets of terminals in the selected group are idle, either or both of test relays 410 and 406 operate to prevent the further advance of switch RM2. The circuit for operating relay 410 is traced from ground on conductor 329, through the winding of relay 410, conductor 445, right inner back contact of relay 307, conductor 376, right No. 3 front contact of relay 407, conductor 446, lower brush 323 and cooperating terminal over a test conductor such as 352, to the selected tandem trunk, such as shown in Fig. 7, right inner back contacts of relay 700, both windings of relay 701 to battery. Both relays 410 and 701 operate in the above traced circuit. The circuit for operating relay 406 is traced from ground on conductor 329, through the winding of relay 406, conductor 447, right outer back contact of relay 307, conductor 367, No. 2 right front contact of relay 407, conductor 448, upper brush 323 and cooperating terminal of bank of switch RM2 over a test conductor similar to conductor 352 to battery over another tandem trunk similar to the one shown in Fig. 7.

The operation of relay 701 closes a circuit for relay 702 from ground on the left outer contacts of relay 701, winding of relay 702, left middle back contacts of relay 700, left, inner back contacts of relay 702, resistance 708 to battery. Relay 700 is in parallel with relay 702 during the time that relay 702 is still unoperated, but the quantity of current flowing through the winding of relay 700 is insufficient to allow it to operate. When relay 702 operates, the parallel path to the winding of relay 700 is opened at the right back contacts of relay 702 and relay 700 thus remains in an unoperated condition, while relay 702 is now held over a path including resistance 709 as well as resistance 708 to battery. Relay 702 disconnects the talking conductors of trunk 334 from the extensions thereof through its left back contacts and over the make of these contacts connects the talking conductors with the windings of relay 703; that is, the conductor engaged by brush 301 of conversational switch selector CS2 through the left winding of relay 703 to ground and the conductor engaged by brush 302 of the same selector to battery through the right winding of relay 703. By this operation conductor 339 is connected through the left outer back contacts of relay 700 to one of the outgoing trunk conductors and conductor 351 is connected through the left inner back contacts of relay 700 to the other outgoing trunk conductor to the tandem office, thereby providing a straight metallic path through the tandem trunk circuit. This path will be utilized for the transmission of impulses as more fully described hereinafter.

The operation of either of the above relays, that is relays 410 or 406 prevents the further advance of switch RM2. If relay 406 operates, it connects the winding of relay 336 over conductor 368 through the front contact of relay 406 and back contact of relay 410 to ground at the left No. 2 back contact of relay 413, thereby operating relay 336. If relay 410 or both relays 410 and 406 operate, relay 336 is not operated, but relay 413 is operated over a circuit from battery through the winding of relay 413, through the front contact of relay 410 to ground at the left No. 2 back contact of relay 413; the right No. 1 front contact of relay 413 is closed to lock this relay to the ground at the left inner front contact of relay 430 before its operating circuit is opened at its left No. 2 back contact. If relay 336 operates, it also causes the operation of relay 413 by connecting the winding of relay 413 through conductor 449, the left outer front contact of relay 336, conductor 368, front contact of relay 406, back contact of relay 410, to ground on the left No. 2 back contact of relay 413. With only relay 413 operated, the winding of relay 410 is short-circuited through the inner right back contact of relay 336, the right No. 2 front contact of relay 413, and the outer right front contact of relay 408 to ground on conductor 329. With both of relays 336 and 413 operated, the winding of relay 406 is short-circuited through the inner right front contact of relay 336, the right No. 2 front contact of relay 413, and the No. 3 right contact of relay 408 to ground on conductor 329. Relays 410 and 406 are thus released as soon as they have caused the operation of relay 336, or relays 336 and 413 as the case may be. Relay 336 controls the connections to the brushes of switch RM2 so that the lower ones of brushes 321, 322 and 324 are operatively effective, to the exclusion of the upper brushes, if the idle set of terminals is found by the lower one of brushes 323; and so that the upper one of brushes 321, 322 and 324 are operatively effective, to the exclusion of the lower brushes if the idle set of terminals is found by the upper one of brushes 323. Relay 413 opens the circuit for holding relay 407 so that relay 407 releases.

Should the first sets of terminals in the selected group of switch RM2 be busy, so that neither of relays 410 and 406 are operated, stepping magnet 320 is operated to advance the brushes of switch RM2 until an idle set of terminals or the last set of terminals in the selected group is reached. The circuit for operating magnet 320 is the same as hereinbefore described. Relay 410, or relay 406, or both of these relays, operate to prevent the further advance of switch RM2 as soon as an idle set of terminals is reached. Should all of the terminals in this group be busy, relay 402 operates when brush 325 reaches the last terminal in the group to prevent the further advance of the switch and relay 402 then closes a circuit for operating relay 307; this circuit may be traced from battery through its winding, conductor 369, No. 3 left front contact of relay 407, No. 3 front contact of relay 408, front contact of relay 402, back contacts of relays 406 and 410, to ground at left No. 2 back contact of relay 413. Relay 307 opens the testing circuits for relays 410 and 406, opens the starting conductor 417 to the register-translators, and connects ground through resistance 308 and the No. 4 front contact of relay 307, conductor 370 and the left No. 5 back contact of relay 403 to hold relay 404 operated, if already operated as hereinafter described. Relay 307 also releases relay 350, thereby connecting ground through the secondary winding of busy tone transformer 414, No. 1 front contact of relay 407, conductor 450, No. 3 back contact of relay 350, condenser 333, right front contact of relay 307, to the conductor connected to the right winding of line relay 331. A busy tone is thus transmitted to the calling subscriber.

It will be assumed that an idle set of terminals was found by the lower one of brushes 323 so that relay 336 is not operated and that connection has been established with an idle tandem trunk and relay 701 in that trunk has operated over a previously traced circuit and a continuous metallic circuit through the trunk is closed to the tandem office as previously described. With relay 413 operated the winding of relay 405 is connected across conductors 339 and 351 by way of the winding of relay 405, right No. 1 normally made contacts of relay 403, conductor 451, right middle back contacts of relay 336, lower brush 322 and cooperating terminal to conductor 351 and winding relay 405, right No. 3 front contacts of relay 413, conductor 452, right outer back contacts of relay 336, lower brush 321 and cooperating terminal to conductor 339 which, as already described, connect with the selected repeater. Since conductors 339 and 351 are connected over a straight metallic path through the tandem trunk by way of the trunk conductors to the tandem office, relay 405 will operate over the circuit just traced but including a battery and ground source supplied through the windings of a line relay at the tandem office when connection is established therewith. Since this invention is not concerned with switching operations at the tandem office, the description thereof is purposely omitted as the manner of connecting the tandem office with the local terminating office and with the called subscriber therein may be accomplished by any of the well known automatic or semi-automatic means without departing from the spirit of the invention.

Relay 405 closes a circuit from battery through the winding of relay 403, front contact of relay 405, left inner back contact of relay 400 to ground at the left No. 2 front contacts of relay 413. Relay 403 locks through its left No. 1 contacts, right No. 1 contacts of relay 413 to ground at the left inner front contacts of relay 430. Relay 403 sends a signal to the register-translator which has connected itself with the control unit C2 as hereinafter described and also transfers the trunk loop extending to the tandem office and including line relay therein from the windings of relay 405 to the terminals of control unit C2 in the banks of the finder switches of the associated register-translators. Relay 405 releases but the line relay at the tandem office is held operated by a bridge in the register-translator as hereinafter described.

The aforementioned operation of relay 413 is also effective to cause the operation of stepping magnet 300 of conversational switch CS2 in a circuit from battery through the winding of magnet 300, brush 313 and cooperating terminal of switch RM1, conductor 371, left No. 1 front contact of relay 413, back contacts of relays 402, 406 and 410, right outer front contact of relay 439, conductor 425, brush 312 and cooperating terminal switch RM1, to ground at the interrupter contacts of magnet 300. Magnet 300 is thus alternately operated and released to advance the brushes 301 to 304 inclusive until they reach the terminals of the trunk selected by the by-path switch RM2; at which time relay 402 operates in a circuit which is traced from battery through its winding, right No. 4 front contact of relay 413, left inner back contact of relay 336, lower brush 324 and cooperating terminal of the selected set in the bank of switch RM2, corresponding terminal cooperating with brush 304 of switch CS2, corresponding terminal cooperating with brush 319 of switch RM1, conductor 372, No. 5 front contact of relay 413, to ground at the right No. 4 back contact of relay 407 (this relay having released when relay 413 operated).

The aforementioned connection of ground over conductor 417 to the register-translators associated with control unit C2 at the time of the operation of relay 350, was effective to operate the starting relay 511 of translator RT and the corresponding relays of the other idle register-translators. We will assume that the translator RT is the one used on the connection being described, and will limit the description to the operation of this translator. The connection from conductor 417 to operate relay 511 may be traced through conductor 417, the normal terminal and brush 605 of numerical switch NS, conductor 628 to the winding of relay 511. Relay 511 closes a circuit for operating the stepping magnet 500 of finder switch RF to advance the brushes of this switch until the terminals, to which control unit C2 is connected, are reached. The circuit for operating magnet 500 is traced from battery through its winding and interrupter contacts, right inner front contact of relay 511, conductor 539, normal terminal and brush 622 of sending switch SM, normal terminal and brush 600 of numerical switch NS, conductor 629 to ground at the back contact of relay 512. When the brushes of switch RF reach the terminals connected to control unit C2, a circuit is closed from ground at the right outer front contact of relay 511, through the winding of relay 512, brush 509 and cooperating terminal, conductor 365, through the left No. 4 back contact of relay 307 of control unit C2, middle left front contact of relay 350, conductor 364, to the windings of relay 404. Relays 512 and 404 operate, the operation of relay 512 opening the circuit for operating magnet 500 to prevent the further advance of switch RF. Relays 512 and 404 lock in a circuit from battery through the right-hand winding and left inner front contact of relay 404, left No. 5 back contact of relay 403 (this relay not having been operated at this time), conductor 370, the No. 4 back contact of relay 307, conductor 365, terminal and brush 509, winding of relay 512 to ground at the left outer front contact of relay 512.

When the register-translator makes connection with the control unit C2 it does not know initially what type of call is being made but a discriminating signal is received, from control unit C2, when relay 403 operates as hereinbefore described, over one of conductors 416, 418 or 419 to operate one or more of relays 515, 516 and 517 and thereby indicate whether the call is one requiring translation, requiring the sending of numerical digits only, or requiring the sending office code, metering code and numerical digits. The call which is involved in the description of this invention being a call completed through a tandem office and requiring metering information at the tandem trunk, ground is received over conductor 419; this connection may be traced from conductor 419, through the right middle front contact of relay 335, left back contact of relay 309, conductor 373, right front contact of relay 404, left No. 4 front contact of relay 403, to ground at the back contact of relay 409. The ground thus connected to conductor 419 is extended through the terminal and brush 503, through the left winding of relay 517, and through the left inner front contact of relay 512, resistance 541 to battery. Relay 517 operates thereby closing the aforementioned circuit for holding the line relay at the tandem office after relay 403 of control unit C2 operates; this circuit is traced from brush 501 of switch RF through the middle right front contact of relay 517, back contact of relay 534, inner right front contacts of relays 512 and 517, to brush 502, the right-hand winding of relay 517 being short-circuited by the contact of relay 512.

Relay 517 also closes a circuit for operating stepping magnet 520 of code switch CM; this circuit is traced from battery through the winding and interrupter contacts of magnet 520, back contact of relay 526, back contact of the continuity contact set of relay 533, to ground at the outer left front contact of relay 517. All of the positions which lead to the same group of control units, one of which, C2, was selected in response to the first digit of the office code, are strapped together and connected to one position in the bank of contacts cooperating with brush 521 of code switch CM; so that the code switch has a home or starting position for each group of control units to which the register-translator has access. Other positions between these home positions correspond to office codes all having the same first digit as the home position with which they are associated. When switch CM has advanced to the home or starting position corresponding to the first digit dialed (that is, to the position corresponding to the control unit group which includes the unit C2) a circuit is closed from battery through the winding of relay 526, right back contact of relay 516, brush 507 and terminal cooperating with brush 521, inner left front contact of relay 517, to ground at the left No. 1 back contact of relay 515. Relay 526 operates thereby opening the circuit for operating magnet 520 so that switch CM stops in the home or starting position corresponding to the first digit dialed. Relay 526 closes a circuit for operating relay 533; this circuit is traced from battery through the winding of relay 533, back contact of relay 529, conductor 518, right front contact of relay 526, back contact of the continuity contacts of relay 533, to ground at the outer left front contact of relay 517. Relay 533 locks over conductor 518 through the front contact of its continuity springs to the same ground. Relay 26 also closes a circuit from the ground at the outer left front contact of relay 517, through the back contact of the continuity contacts of relay 533 and the right front contact of relay 526 over conductor 518, brush 620 and normal terminal cooperating bank in sending switch SM, conductor 630, right back contact of relay 527, conductor 536, outer left back contact of relay 515, inner left back contact of relay 535, winding of relay 528 and through resistance 519 to battery. Relay 533 maintains this circuit through the front contact of its continuity contacts instead of through the back contact of the same and the right front contact of relay 526. Relay 528 is not operated unless or until the contacts of interrupter 531 are opened, there otherwise being a short-circuit around the winding of relay 528 from resistance 519 and through the back contact of relay 528 through the left back contact of relay 527 and through the upper contacts of interrupter 531 to conductor 518. When interrupter 531 operates, that is, when it breaks its contacts, relay 528 operates over the previously traced circuit and locks by connecting conductor 536 through its inner left front contact and the back contact of relay 530 to conductor 518. Relay 528 closes a circuit for operating relay 527; this circuit may be traced from battery through the winding of relay 527, right front contact of relay 528, left front contact of relay 526, left back contact of relay 516 to ground on conductor 518. When relay 527 operates it closes an impulsing circuit from the ground on conductor 518 through the upper contacts of interrupter 531, the front contact of relay 527, winding of relay 530, brush 508 and cooperating terminal on the bank of switch RF, conductor 542, middle right back contact of relay 349 in control unit C2, brush 344 of switch RM3 and cooperating strapped terminals of the routing group to which RM3 was advanced by the third digit dialed and through the upper left front contact of relay 335 to the winding of stepping magnet 340 of switch RM3. Every time the contacts of interrupter 531 close and open, the relay 530 and magnet 340 operate and release. The first operation of relay 528 and each operation of relay 530 closes a holding circuit through its left front contact over relay 527. Each operation of relay 530 also closes the ground on conductor 518 through its right front contact to the winding of stepping magnet 520 of code switch CM. Thus, the brushes of switch RM3 in control unit C2 and the brushes of code switch CM are advanced one step for every closure of the contacts of interrupter 531 after relay 527 operates, until the brushes of switch RM3 have been advanced beyond the last strap routing group terminal in the bank cooperating with brush 344. Relay 527 is a slow-to-release relay and remains operated during the advance of code switch CM. As soon as the brushes of switch CM have advanced from the home or starting position to which it was initially advanced, relay 526 releases. Relay 527 releases when the impulsing circuit is opened at brush 344. In this manner the brushes of code switch CM have been advanced to a position which represents the office code of the called number.

The register-translator is now ready to transmit to the tandem office the office code impulses and also, when received, the impulses representing the numerical digits of the called subscriber's line. The release of relay 527, after the setting of coding switch CM again closes the circuit for operating relay 528 as hereinbefore described and relay 528 reoperates if, or as soon as, the contacts of interrupter 531 are opened. When relay 528 reoperates it connects the ground on conductor 518 through the upper contacts of interrupter 531, the left back contact of relay 527, outer left front contact of relay 528 to the winding of stepping magnet 619 of sending switch SM. Magnet 619 operates when the interrupter closes its contacts thereby advancing the brushes of switch SM to position 2. Relay 534 now operates in a circuit from battery through its winding, No. 3 back contact of relay 515, conductor 543, terminal 2 and brush 620 to ground on conductor 518. Relay 534 opens the short-circuit around the lower contacts of interrupter 531, thus rendering these contacts effective to interrupt the connection from brush 501 of switch RF through the middle right front contact of relay 517, lower interrupter contacts of interrupter 531, inner right front contacts of relays 512 and 517 to brush 502 of switch RF. Since the terminals with which brushes 501 and 502 are in contact connect through the inner right front contacts of relay 403 and the back contacts of relay 336 through the lower brushes 321 and 322 over conductors 339 and 351 and the metallic through circuit of the tandem trunk to the trunk conductors and thence to the windings of the line relay in the tandem office, the line relay is thereby released each time the lower contacts of interrupter 531 are opened after relay 534 operates. The impulses are thus transmitted through the tandem trunk circuit without repetition thereat because of the existence of the straight metallic connection therethrough as described above. At the same time, the upper contacts of interrupter 531 continue to operate and release magnet 619 of switch SM so that the brushes of this switch are advanced until the proper number of impulses have been transmitted.

The terminals of the bank cooperating with brush 621 of sending switch SM are divided into groups corresponding to the digits of the translated office code. Terminals 3 to 12 constitute the first group and represent the first digit of the translated code. They are connected as required to the terminals in the bank cooperating with brush 522 of code switch CM. Terminals 15 to 24 constitute the second group and represent the second digit of the translated code; they are connected as required to the terminals of bank cooperating with brush 523 of switch CM. Terminals 27 to 36 constitute the third group and represent the third digit of the translated code; they are connected as required to the terminals of bank cooperating with brush 524 of switch CM; and if a fourth office code digit is used, terminals 39 to 48 are connected as required to the terminals in bank cooperating with brush 525 of switch CM. When brush 621 reaches the terminal corresponding to the first digit of the translated code, relay 535 operates in a circuit from battery through its winding and continuity contacts, conductor 544, brush 621 and cooperating terminal in bank of sender switch SM, brush 522 and cooperating terminal of code switch CM, through the inner right front contact of relay 533, to ground at the No. 1 back contact of relay 515. Relay 535 short-circuits the lower interrupter contacts of interrupter 531 to prevent further opening of the circuit of the line relay at the tandem office and opens the circuit for holding relay 528. Relay 535 closes a circuit from battery through the winding and interrupter contacts of magnet 619, conductor 631, inner right front contact of relay 535, No. 3 back contact of relay 515, conductor 543, strapped terminals 2 to 12 and cooperating brush 620, to ground on conductor 518. The brushes of switch SM are thus advanced to position 13 in which the circuit for relay 534 and magnet 619 is opened. Relay 534 is a slow-to-release relay so that it does not release during the movement of switch SM but releases when position 13 is reached. Relay 535 also releases slowly after its holding circuit is opened by the release of relay 534.

When relay 535 releases, relay 528 reoperates and switch SM is advanced to position 14 in the same manner that it was advanced to position 2. Relays 534 and 535 and interrupter 531 now operate to advance switch SM from position 14 to position 25 in the same manner that it was advanced from position 2 to position 13; and during this advance, the impulses corresponding to the second translated digit, as indicated by the terminal with which brush 523 of code switch CM is in contact, are transmitted in the same manner that the impulses corresponding to the first translated digit were transmitted. In like manner the remaining digit or digits of the translated office code are transmitted during the advance of sending switch SM from position 26 to 36 and from position 38 to 48. If the translated office code consists of a fewer number of digits, the corresponding positions of switch SM are passed by since the contacts of the remaining banks of code switch CM will be connected to as many of terminals 37, 25, and 13 in bank cooperating with brush 620 as is necessary to hold relays 534 and 535 operated until switch SM reaches position 49.

During the time that the code switch CM is being positioned and the translated office code digits are being transmitted, the numerical impulses have been received by line relay 331 of control unit C2 and retransmitted to the numerical switch NS of the register-translator RT. The circuit for operating the stepping magnet 625 of switch NS may be traced from battery through its winding, conductor 632, back contact of relay 514, winding of relay 513, outer right front contact of relay 512, brush 506, and cooperating terminal switch RF, conductor 416, left No. 3 back contact of relay 403 left No. 2 front contact of relay 412, left inner front contact of relay 408, right-hand front contact of relay 430, winding of relay 400, conductor 423, to ground at the back contact of relay 331. Each operation and release of magnet 625 advances switch NS one position. Relay 513 operates in series with magnet 625 and, being slow to release, it remains operated until all of the impulses have been received. Relay 513 closes an obvious circuit for operating relay 514 which is also of the slow-to-release type. When relay 513 releases at the end of the first series of impulses, and before relay 514 releases, a circuit is closed for operating that combination of register relays 609, 608, 607 and 606 as corresponds to the first numerical digit (the thousands digit) as indicated by the position to which the switch NS was advanced, and as controlled by the wiring on terminals 2 to 11 of banks cooperating with brushes 602, 603, 604 and 605. For instance, assuming the first numerical digit to be 2, a circuit is closed from battery through the windings of relays 609, 608 and 607 and brushes 602, 603 and 604 in position 3, conductor 633, through the inner left front contact of relay 514 and the back contact of relay 513 to ground at the outer left front contact of relay 512. Relays 609, 608 and 607 operate and lock through their outer upper front contacts, over conductor 537, to the same ground. When relay 514 releases the circuit for operating the register relays is opened but numerical switch NS is advanced until it reaches position 12; the circuit for operating magnet 625 is traced from battery through its winding and interrupter contacts, conductor 634 outer back contact of relay 514, conductor 545, strapped terminals 2 to 11 inclusive of bank cooperating with brush 627, to ground on conductor 537. The numerical switch NS remains in position 12 until the impulses corresponding to the next numerical digit (the hundreds digit) are received from relay 331.

Switch NS is now advanced, under control of impulses received by relay 331 when the second numerical digit is dialed, to the corresponding one of positions 13 to 22 in the same manner that it was advanced to the position corresponding to the first numerical digit. That combination of register relays 610 to 613, inclusive, which corresponds to this position is then operated and locked in the same manner that the register relays 606 to 609, inclusive, were operated. The switch NS continues to be advanced until position 23 is reached, in the same manner that it was advanced to position 12. In like manner the third numerical digit (the tens digit) is received by switch NS and transferred to register relays 614 to 617, inclusive. The fourth or units digit of the called member is likewise received by switch NS, relay 514 being held operated to prevent the further advance of the numerical switch until all of the numerical digits have in turn been transmitted to the tandem office as hereinafter described.

Since either relay 609 or relay 607 is always operated, according to the thousands digit, relay 528 reoperates as soon as the thousands digit has been registered; the circuit for relay 528 is traced from battery resistance 519, through its winding, inner left back contact of relay 535, No. 4 and 2 back contacts of relay 515, conductor 538, lower front contact of relay 609 (or 607), terminal 49 and brush 620 of switch SM, to ground on conductor 518. Relay 528 locks under control of relay 530 as hereinbefore described. The sending switch SM and relays 534 and 535 now operate under control of interrupter 531 and register relays 606 to 608, inclusive, to transmit a train of impulses corresponding to the first numerical digit, terminals 51 to 60 inclusive of bank cooperating with brush 621 being connected to the contacts of the thousands register relays to secure this result. Thus for the thousands digit being 2, as already assumed, two impulses are transmitted as the sending switch steps from position 50 to position 52; and in position 52 relay 535 operates, the circuit for operating relay 535 being traced from battery through its winding and continuity contacts, conductor 544, brush 621 and cooperating terminal 52, middle lower back contact of relay 606, inner upper front contacts of relays 608 and 609 to ground at the inner upper front contact of relay 607. The switch SM continues to be advanced until position 61 is reached at which time relay 534 releases.

The switch SM remains in position 61 until the hundreds digit has been registered as indicated by the operation of one of relays 610 or 612. Relay 528 then reoperates and the SM switch is advanced under the control of relays 534 and 535, interrupter 531, and register relays 610 to 613 inclusive, to transmit a train of impulses corresponding to the second or hundreds numerical digit, terminals 63 to 72, inclusive, of bank, cooperating with brush 621, being connected to the contacts of the hundreds register relays to secure this result. The switch SM continues to be advanced until position 73 is reached at which time relay 534 releases. The switch SM remains in position 73 until all of the impulses corresponding to the tens digit have been received as indicated by the operation of either one of register relays 614 or 616. Impulses corresponding to the tens digit are then transmitted during the advance of switch SM from position 73 to 85 under control of relays 534 and 535, interrupter 531, and register relays 614 to 617 inclusive, terminals 75 to 84 of bank, cooperating with brush 621, being connected to the contacts of the tens register relays to secure this result. Relay 534 releases to stop switch SM when position 85 is reached. The switch SM remains in position 85 until all of the impulses corresponding to the units digit have been received, as indicated by the operation of register relay 614 or 616 and the operated condition of relay 514 which is held through terminals 35 to 45 of bank cooperating with brush 627 of switch NS. Impulses corresponding to the units digit are then transmitted during the advance of switch SM from positions 85 to 96 under control of relays 534 and 535, interrupter 531, and the banks cooperating with brushes 602 to 605, inclusive, of the switch NS, terminals 87 to 96, inclusive, of bank cooperating with brush 621 being connected to terminals 35 to 44, inclusive, of banks cooperating with brushes 602 to 605, inclusive, of switch NS to secure this result.

All of the numerical impulses have now been transmitted to the tandem office by the register-translator and since the impulsing loop was the same as the one used for the transmission of the code impulses, the numerical impulses have likewise been transmitted through the tandem trunk without repetition thereat. With the brushes of switch SM in position 96 a circuit is closed from the ground on conductor 518, brush 620 and cooperating terminal 96, conductor 635, brush 510 and cooperating terminal of switch RF, conductor 454 to the winding of relay 307 of control unit C2. Relay 307 operates and opens the circuit over conductor 365 through brush 509 of switch RF so that relay 512 of register-translator RT and relay 404 of the control unit C2 release. The release of relay 512 opens the circuit through the left winding of relay 517, but it also removes the short-circuit around the right winding of relay 517 so that this relay remains operated and the circuit through the brushes 501 and 502 to the windings of the line relay at the tandem office is maintained until the connection is broken at the repeater as hereinafter described.

The aforementioned operation of relay 307 also closes a circuit from battery through the winding of relay 305 of conversational switch CS2, brush 314 and cooperating terminal of switch RM1, conductor 374, right inner front contact of relay 439, resistance 415, right No. 3 front contact of relay 403, conductor 455, No. 2 front contacts of relay 307, conductor 449, right No. 1 front contact of relay 413 to ground at the left inner front contact of relay 430. Relay 305 operates in this circuit thereby extending the talking conductors of trunk 244 through the inner left front contacts of relay 305 and through brushes 301 and 302, trunk 334 to relay 703 of the tandem trunk. Relay 305 disconnects the sleeve conductor of trunk 244 from control unit C2 and connects this conductor through its left No. 3 front contact and through brush 303 and cooperating terminal, conductor 710, resistances 709 and 708 to battery and winding of relay 702 to ground at the left outer front contact of relay 701. The path just traced is closed to battery through the right contact and winding of relay 305 and the current flowing through the combined parallel circuit is sufficient to maintain relays 305 and 200 locked and relay 702 operated while the resulting potential on terminal and brush 303 is sufficient to guard the selected tandem trunk against seizure by other control units. Relay 305 also disconnects its conductor 225 from the control unit C1.

Relay 703 now operates over the previously described path by virtue of relay 305 closing the trunk loop from the calling subscriber's line and, in operating, closes a substitute circuit for relay 701 from ground on the left outer contacts of relay 703 to the right winding of relay 701 to guard against the release of this relay when its operating circuit is opened at the right inner contacts of relay 700. Relay 703 also closes a circuit for operating relay 700 from ground on its left inner contacts, contacts of relay 707, winding of relay 700 to battery. Relay 700 operates and connects the winding of relay 704 over its left outer front contacts to conductor 339 and the winding of relay 705 through its left inner front contacts to conductor 351. Relay 703, by its operation, also connects over its right contacts an impedance bridge across the trunk consisting of the lower windings of polarized relay 707 in series with retard coil 706 and in parallel with the condensers connected to the windings of relay 703. Relay 707 is now bridged across the trunk leading to the tandem office and provides a new holding circuit for the line relay at the tandem office since the original holding circuit of the line relay has now been opened by the operation of relay 700. Relay 707, however, is polarized with the establishment of a polarizing circuit through its upper winding and the direction of current flow through its lower winding in the above traced circuit is such as not to cause its operation at this time.

When relay 700 operates and disconnects conductors 339 and 351 from the trunk conductors and connects them to relays 704 and 705, respectively, the battery and ground circuit holding relay 517 through its right winding is broken and relay 517 releases. The line relay at the tandem office is now held by relay 707 and coil 706, as previously described. When relay 517 releases, its right back contacts are connected to terminals MA and MB. These terminals are jumpered to terminals MA1 and MB1, respectively, and these last, in turn, are connected to separate terminals on the banks of code switch CM. The winding of relay 511 is likewise connected to another terminal of the same switch through resistance 549. Depending upon the office code which was dialed by the subscriber, the brushes of code switch CM have been advanced to a certain group of terminals wherein brush 521 either engages the terminal connected with the winding of relay 511 or the terminal connected with the terminal MA1 or the terminal connected with terminal MB1, or brush 521 connects with a terminal which is wired to none of the above terminals. If the switch brushes are standing on a group of terminals wherein brush 521 engages the terminal connected with terminal MA1 then, when relay 517 releases, a path is closed from ground on the No. 1 back contacts of relay 515, right inner contacts of relay 533, brush 521 and cooperating terminal, terminal MA1, conductor 547, terminal MA, right middle back contacts of relay 517, brush 501 and cooperating terminal, right No. 1 front contacts of relay 403, conductor 451, right middle back contacts of relay 336, lower brush 322 and cooperating terminal, conductor 351, left inner front contacts of relay 700, winding of relay 705, resistance 716 to battery. Relay 705 operates in this circuit and locks over its left inner contacts to ground on the right contacts of relay 701.

If the switch brushes are standing on a group of terminals wherein brush 521 engages a terminal connected with terminal MB1 then, when relay 517 releases, a circuit is closed from the aforetraced ground to brush 521 and cooperating terminal, terminal MB1, conductor 548, terminal MB, right inner back contacts of relay 517, brush 502 and cooperating terminal, right No. 2 front contacts of relay 403, conductor 452, right outer back contacts of relay 336, lower brush 321 and cooperating terminal, conductor 339, left outer front contact of relay 700, winding of relay 704, resistance 716 to battery. Relay 704 operates and locks over its left inner contacts to ground on the left contacts of relay 701.

If the switch brushes are standing on a group of terminals wherein brush 521 engages a terminal connected to the winding of relay 511 then when relay 517 releases a path is closed to operate relay 511 from an aforetraced ground to brush 521 and cooperating terminal, resistance 549, winding of relay 511 to battery. Relay 511 operates and, by closing its left inner contacts, connects ground from the left No. 1 back contacts of relay 515, right inner contacts of relay 533, left contacts of relay 511 to terminals MB1 and MA1. The previously traced circuits over the paths connecting the terminals MB1 and MA1, respectively, are now both effective and relays 705 and 704 operate and lock as previously described.

If the switch brushes are standing on a group of terminals wherein brush 521 engages a terminal connected with neither MB1 nor MA1, nor to the relay 511, then none of the circuits traced are effective and neither relay 705 nor relay 704 operates. Thus it is possible to send four discriminating signals from the code switch to the tandem trunk for zone metering purposes, wherein the failure to operate either relay 705 or 704 will result in a free call to the calling subscriber's meter as more clearly described hereinafter.

Simultaneously with the operations described above, when relay 517 releases, relays 533 and 514 also release. The release of relay 514 closes a circuit from battery through the winding and interrupter contacts of magnet 625, conductor 634, right outer back contact of relay 514, conductor 545, off-normal terminals and brush 600 of switch NS, conductor 629 to ground at the back contact of relay 512. The brushes of switch NS are advanced to their normal position. When switch NS reaches its normal position, the stepping magnet 619 of switch SM is energized in a circuit from battery through its winding and interrupter contacts, conductor 631, off-normal terminals and brush 622, normal terminal and brush 600 of switch NS to ground at the back contact of relay 512. The brushes of switch SM are thereby advanced to their normal position. The code switch CM and finder switch RF remain in the positions in which they are standing until advanced therefrom on the next call.

The aforementioned operation of relay 307 also opens the holding circuit for relay 350 since this circuit included the left inner back contact of relay 307. The release of relay 350 causes the release of relay 430 since the circuit for holding relay 430 included the right inner front contact of relay 350. The release of relay 430 opens the circuits of relays 408, 337, 413 and 403. Relay 403 is a slow-to-release relay in order to insure that the circuits described above for the operation of relays 705 and 704 will not be disturbed during the small time interval required to operate these relays. The release of relay 337 opens the circuit for relay 439. The release of relay 439 causes the release of relay 331 and the release of relay 331 causes the release of relay 332. The release of relay 332 disconnects ground from conductor 329 thereby causing the release of relay 412. The release of relay 412 releases relays 335 and 401. The release of relay 413 closes a circuit from ground at its left No. 2 back contact, back contacts of relays 410, 406 and 402, left No. 1 back contact of relay 413, conductor 357, off-normal terminals and brush 326 of switch RM2, through the interrupter contacts and winding of relay 320 to battery. Magnet 320 thereby advances the brush of switch RM2 to normal. When the brushes 321 and 322 of switch RM2 are disconnected from conductors 339 and 351 the previously traced circuits for operating relays 705 and 704 is broken, but due to the fact that the operating time of these relays is small relative to the time taken to release relay 403 and advance switch RM2, relays 704 or 705 or both of them will have been operated by the time circuit paths are broken, either by the release of relay 403 or advance of switch RM2. The release of relay 408 closes a circuit from battery through the winding of magnet 310, conductor 353, No. 1 back contact of relay 408, right inner back contact of relay 430, conductor 456, brush 315 and off-normal terminals of switch RM1, back contact of relay 337, through the interrupter contacts of magnet 310 to ground. Magnet 310 thereby advances the brushes of switch RM1 to their normal position. The release of relay 408 also closes a circuit from ground at its left outer back contact, back contact of relay 401, conductor 457, off-normal terminals and brush 345 of switch RM3 and through the interrupter contacts and winding of magnet 340 to battery. Magnet 340 thereby advances the brushes of switch RM3 to their normal position. Control unit C2 is now ready for the next call, conductor 306 being connected through resistance 327 to battery as hereinbefore traced.

The extension of the connection from the tandem office to the called subscriber via the local office may be accomplished in any well-known manner and the called subscriber's supervisory circuit including relay 707 is of the reverse battery type, also well-known to the art, so that they do not form a part of the description of this invention. If the called subscriber does not answer, then relay 707 does not operate and further operations for actuating the calling subscriber's meter do not take place. Under such circumstances there will be no charge for the call. When the calling subscriber restores, therefore, relay 703 releases, in turn releasing relays 701, 702 and 700, thereby restoring the tandem trunk to normal while the removal of ground from the left outer contacts of relay 701 unlocks relay 305, which in turn removes the circuit holding relays 200 and 201 operated. These relays release and make the respective conversational switches available for another call.

If the called subscriber answers, however, then the reversal of battery at the tandem office causes the operation of relay 707 over the trunk loop by way of the right contacts of relay 703. Relay 707 in operating opens the circuit of relay 700 causing this relay to release. A circuit is now closed from ground on the right outer back contacts of relay 700, left outer contacts of either relay 704 or 705, resistance 712, conductor 805, winding of relay 807 to battery. When relay 807 operates it closes a circuit from battery through the winding and interrupter contacts of magnet 806 of switch TD, left contacts of relay 807, left back contacts of relays 808 and 809 to ground. The brushes of switch TD are thereby advanced until they reach the terminals to which repeater TR is connected, at which time either or both of relays 808 and 809 operate depending on which of the zone relays 704 and 705 are operated. The circuit for operating relay 808 is traced from battery through the winding of relay 808, brush 801 and cooperating terminal, conductor 711, right contacts of relay 704 to ground on the right middle back contacts of relay 700. The circuit for operating relay 809 is traced from battery through the winding of relay 809, brush 804 and cooperating terminal, conductor 713, right contacts of relay 705 to ground on the right middle contacts of relay 700. The operation of either of relays 808 or 809 opens the circuit for magnet 806 so as to stop the advance of switch TD.

As soon after the operation of either or both of relays 808 and 809 as the pick-up conductor 815 is connected to ground at interrupter 819, either or both of relays 812 and 811 operate. The interrupter is arranged to transmit one, two or three impulses over conductors 816, 814, and 817 to operate the calling subscriber's charging meter once, twice or three times as controlled by relays 811 and 812. If only relay 812 is operated, one ground impulse is transmitted over conductor 816 through the left inner back contacts of relay 811, the right inner front contacts of relay 812, left contacts of relay 810, brush 800 and cooperating terminal, conductor 714, trunk hold conductor 710 of trunk 334, brush 303 and cooperating terminal, No. 3 front contacts of relay 305, hold conductor of trunk 244, brush 204 and cooperating terminal, left inner contacts of relay 200, brush 133 and cooperating terminal, brush 113 and cooperating terminal, conductor 105, winding of message register 104 to battery. The message register 104 operates in this circuit and registers a single charge for the call.

If only relay 811 is operated, two ground impulses are transmitted over conductor 814, right inner front contacts of relay 811, right inner back contacts of relay 812, left contacts of relay 810 and thence to brush 800 and over the previously described circuit to operate message register 104 twice and thereby register two charges for the call. If both relays 811 and 812 are operated three ground impulses are transmitted over conductor 817, left inner front contacts of relay 811, right inner front contacts of relay 812, left contacts of relay 810 and thence to brush 800 and over the previously described circuit to operate message register 104 three times and thereby register three charges for the call. When a complete cycle of metering impulses has been transmitted either over conductor 816, or conductor 814, or conductor 817 ground is connected over conductor 813 to operate relay 810 either over the right outer contacts of relay 811 or the left contacts of relay 812 and normally made continuity contacts of relay 810 and thereby open the operating circuit of message register 104. Relay 810 locks through its continuity contacts to ground on start relay 807 and connects ground through its right-hand front contacts, brush 803 and cooperating terminal, conductor 715 to the resistance 716 in series with the battery which holds relay 704 and 705 operated. Relays 704 and 705 are short-circuited and release. The release of relays 704 and 705 causes the release of relays 808 and 809 and also the release of relay 807. The release of relay 807 opens the locking circuit of relay 810. The translating device TD is now ready for use on another call.

Conversation is in progress between the calling station A and called station B. Should the called station B flash his receiver, polarized relay 707 will follow the flashes and alternately open and close the circuit of relay 700. When relay 700 in following the operation of relay 707 releases, it short-circuits resistance 709, thereby permitting a greater flow of current over the hold conductor of the trunk: On the type of call herein described, that is, a complete automatic connection, this feature is of no value but it is possible to use the tandem trunk on calls set up by an operator at the originating office wherein supervision of the call at the operator's position is required. Under such circumstances the short-circuiting of resistance 709 provides means for flashing the called supervisory feature of any type of telephone cord which may be used on such calls on the well-known "high-low" supervision basis.

When the subscriber at station A replaces the receiver, relay 703 of the repeater releases. Relay 703 opens the bridge through relay 707 across the repeater so as to cause the release of apparatus in tandem office TAN and local office LOC. Relay 703 also disconnects the holding ground from the winding of relay 701 so that relay 701 releases. The release of relay 701 reconnects both windings in parallel to test conductor 352 so that repeater TR is now ready to be seized again for another call. Relay 701 also disconnects the holding circuit over trunk conductor 710 so that relays 305, 200, 201 and 103 release, thus rendering the line-finders LF1 and LF2 and the conversational switches CS1, CS2 and CS3 for use on another call.

What is claimed is:

1. In a telephone system a calling line, a meter for said calling line, a called line, an impulse sender, a tandem trunk, a translating device, means for connecting said tandem trunk to said impulse sender, means in said tandem trunk for forwarding impulses from said impulse sender without repetition at said tandem trunk, means in said tandem trunk for registering a charging condition transmitted by said impulse sender, means including said tandem trunk for establishing a talking connection between said calling line and said called line, means in said tandem trunk responsive to said called line for connecting said translating device to said tandem trunk and means responsive to the establishment of said connection between said tandem trunk and said translating device for operating said meter in accordance with the said charging registration in said tandem trunk.

2. In a telephone system a calling line, a meter for said calling line, a called line, an impulse sender, a tandem trunk, said tandem trunk comprising an impedance circuit and a through metallic circuit, a translating device, means for connecting said tandem trunk to said impulse sender, means responsive to said connection of said tandem trunk with said impulse sender for causing said impulse sender to transmit impulses over the metallic circuit of said tandem trunk without repetition at said tandem trunk, means in said tandem trunk for registering a charging condition transmitted by said impulse sender, means in said tandem trunk responsive to the termination of the transmission of said impulses for disconnecting said through impulsing circuit and for connecting said impedance circuit to said tandem trunk, means including said tandem trunk for establishing a connection between said calling and said called line, means in said tandem trunk responsive to said called line for connecting said translating device to said tandem trunk and means responsive to the establishment of said connection between said tandem trunk and said translating device for operating said meter in accordance with the said charging registration in said tandem trunk.

3. In a telephone system a calling line, a called line, an impulse sender, a tandem trunk, a translating device, means for connecting said tandem trunk to said impulse sender, means in said tandem trunk for forwarding impulses from said impulse sender, without repetition at said tandem trunk, means in said tandem trunk for registering a charging condition transmitted by said impulse sender, means including said tandem trunk for establishing a connection between said calling line and said called line, and means in said tandem trunk responsive to said called line for passing back supervisory signals without repetition in said repeater.

4. In a telephone system a calling line, a meter for said calling line, a called line, an impulse sender, a tandem trunk, said tandem trunk comprising a through metallic circuit and an impedance circuit, said through circuit being normally established through the said tandem trunk, a translating device, means for connecting said tandem trunk to said impulse sender, means in said tandem trunk including said through circuit for forwarding impulses from said impulse sender through said tandem trunk without repetition, means in said repeater for registering a charging condition transmitted by said impulse sender, means in said tandem trunk responsive to the termination of the transmission of said impulses for disconnecting said through circuit and for connecting said impedance circuit to said tandem trunk, means including said tandem trunk for establishing a talking connection between said calling line and said called line, means in said tandem trunk responsive to said called line for connecting said translating device to said tandem trunk and means responsive to the establishment of said connection between said tandem trunk and said translating device for operating said meter in accordance with said charging registration in said tandem trunk.

5. In a telephone system comprising conversational selector switches and by-path switches each of which is associated with a plurality of conversational switches, a tandem trunk comprising a through metallic circuit and an impedance circuit, said through metallic circuit being normally established through said tandem trunk, the incoming conductors of said tandem trunk being multiplied in the banks of both said by-path switches and conversational switches, an impulse sender, means for connecting said impulse sender to one of said by-path switches which is associated with incoming conductors of said tandem trunk and means including said through circuit of said tandem trunk for forwarding impulses from said impulse sender through said tandem trunk without repetition thereat.

6. In a telephone system comprising conversational selector switches and by-path switches each of which is associated with a plurality of conversational switches, a tandem trunk comprising a through metallic circuit, a registering circuit, an impedance circuit and a relay, the normal contacts of said relay normally establishing said through metallic circuit through the said tandem trunk, the incoming conductors of said tandem trunk being multiplied in the banks of one of said by-path switches and conversational switches, and means responsive to the seizure of said tandem trunk by said conversational switch for operating said relay to disconnect the said by-path switch from the through circuit and to connect it to said registering circuit.

7. In a telephone system a calling line, a meter for said line, an impulse sender, a translating device, a trunk means for connecting said tandem trunk to said impulse sender, means in said tandem trunk for forwarding impulses therethrough from said sender without repetition at said tandem trunk, a first and second relay in said tandem trunk, means responsive to the termination of the transmission of impulses for operatively connecting said first and second relay with said impulse sender and for operating either said first or second or both of said relays from said impulse sender, a called line, means including said tandem trunk for establishing a connection between said calling line and said called line, means in said tandem trunk responsive to said called line and controlled by either of said operated relays for connecting said translating device to said tandem trunk and means responsive to the establishment of said connection between said tandem trunk and said translating device for operating said meter in accordance with the operated or non-operated condition of said relays.

8. In a telephone system, a calling line, a called line, an automatic switch, a message register for said calling line, a group of tandem trunks connected to terminals in the bank of said switch, an impulse sender, means for connecting said calling line to said impulse sender, means for advancing the brushes of said switch to the said group of tandem trunks in response to a train of impulses corresponding to a plurality of digit series, means in said switch for selecting an idle tandem trunk from said group, means in said tandem trunk for forwarding impulses therethrough without repetition at said tandem trunk, means including said switch and said tandem trunk for extending a connection from said calling line to said called line, means in said tandem trunk for registering other impulses from said impulse sender, and means for operating said message register in accordance with the number of impulses registered in said tandem trunk.

9. In a telephone system, a calling line, a called line, a message register for said calling line, a selector switch, a marking switch, a tandem trunk, means including said selector switch, said tandem trunk and said marking switch for establishing a connection between said lines, groups of terminals in the bank of said selector switch, an impulse sender associated with said marking switch, means for advancing the brushes of said marking switch to a position corresponding to the number of impulses received, means in said tandem trunk for forwarding other impulses therethrough without repetition at said tandem trunk, means effective in any one of a plurality of positions of said marking switch to mark the same group of terminals in the bank of said selector switch, means for advancing the brushes of said selector switch to said marked group of terminals, means in said tandem trunk for registering any one of the plurality of positions to which the said marking switch is advanced, a translating device, means for connecting said translating device to said tandem trunk, and means responsive to the establishment of said connection of said tandem trunk to said translating device for variably operating said message register in accordance with the registration in the tandem trunk of the position to which the said marking switch is advanced.

10. In a telephone system, a calling line, a called line, a meter for said calling line, a group of conversational switches, a tandem trunk, means including one of said switches and said tandem trunk for establishing a connection between said lines, a common control unit for said switches comprising a code switch and a selector switch, an impulse sender associated with said code switch, registering means associated with said code switch, registering means associated with said tandem trunk, a group of terminals in the bank of said selector switch and corresponding groups of terminals in the banks of said conversational switches, means for advancing the brushes of said marking switch to a position corresponding to the number of impulses received, means in said tandem trunk for forwarding other impulses through said tandem trunk without repetition thereat, means including a brush of said code switch for variably operating said registering means associated with said code switch according to the particular one of said plurality of positions to which the code switch is advanced, means for variably operating said registering means associated with said tandem trunk according to the variable operation of said registering means associated with said code switch, and means for variably operating said message register in accordance with the variable operation of said registering means associated with said tandem trunk.

11. In a telephone system, a calling line, a called line, a meter for said calling line, a group of conversational switches, a group of tandem trunks, means including one of said switches and one of said tandem trunks for establishing a connection between said lines, a common control unit for said switches and said tandem trunks, said control units comprising a code switch and a selector switch, an impulse sender associated with said code switch, registering means associated with said code switch, registering means associated with each of said tandem trunks, groups of terminals in the banks of said selector switch and corresponding groups of terminals in the banks of said conversational switches, means for advancing the brushes of said code switch to a position corresponding to the number of impulses received, means in said tandem trunk for forwarding other impulses therethrough without repetition at said tandem trunk, means including one of the brushes of said code switch for variably operating said registering means associated with said code switch according to the particular one of said plurality of positions to which the code switch is advanced, means for variably operating said registering means associated with said one of said tandem trunks according to the variable operation of the registering means associated with said code switch, and means common to said group of tandem trunks for variably operating said message registering in accordance with the variable operation of the registering means associated with one of said tandem trunks.

12. In a telephone system, a calling line, a called line, selector switches and a tandem trunk for extending a connection from said calling line to said called line, means in said tandem trunk for forwarding impulses therethrough without repetition upon the seizure of said tandem trunk by said selector switches, an impedance bridge for said tandem trunk and means effective upon the termination of the transmission of impulses through said tandem trunk for connecting said bridge to the outgoing talking conductors of said tandem trunk.

13. In a telephone system, a calling line, a called line, selector switches and a tandem trunk for extending a connection from said calling line to said called line, means in said tandem trunk for forwarding impulses through said tandem trunk without repetition upon the seizure of said tandem trunk by said selector switches, condensers and an impedance bridge for said tandem trunk, and means effective upon the termination of the transmission of impulses through said tandem trunk for connecting said bridge to the outgoing talking conductors of said tandem trunk and for interposing said condensers in said talking conductors.

14. In a telephone system, a calling line, a called line, selector switches and a tandem trunk for extending a connection from said calling line to said called line, a means in said tandem trunk for forwarding impulses therethrough without repetition upon the seizure of said tandem trunk by said selector switches, an impedance bridge, means for connecting said bridge across the incoming talking conductors of said tandem trunk upon the seizure thereof, a second impedance bridge and condensers at said tandem trunk, and means effective upon the termination of the transmission of impulses through said tandem trunk for connecting said second bridge to the outgoing talking conductors of said tandem trunk and for interposing said condensers in said talking conductors between said bridges.

15. In a telephone system, a calling line, a called line, selector switches and a tandem trunk for extending a connection from said calling line to said called line, means in said tandem trunk for forwarding impulses therethrough without repetition upon the seizure of said tandem trunk by said selector switches, an impedance bridge, means for connecting said bridge across the incoming talking conductors of said tandem trunk upon the seizure thereof, a second impedance bridge and condensers in said tandem trunk, means effective upon the termination of the transmission of impulses through said tandem trunk for connecting the incoming talking conductors of said tandem trunk to said calling line, and means controlled over said first impedance bridge and the calling line for connecting said second bridge across the outgoing talking conductors of said tandem trunk and for interposing said condensers in said talking conductors between said bridges.

16. In a telephone system, a calling line, a called line, selector switches and a tandem trunk for extending a connection from said calling line to said called line, means in said tandem trunk for forwarding impulses therethrough without repetition upon the seizure of said tandem trunk by said selector switches, an impedance bridge for said tandem trunk including a relay, means operative upon the completion of the transmission of impulses through said tandem trunk for operating said relay over the calling line, and means controlled by said relay for opening said impulsing circuit at said tandem trunk.

17. In a telephone system, a calling line, a called line, selector switches and a tandem trunk for extending a connection from said calling line to said called line, means in said tandem trunk for forwarding impulses therethrough without repetition upon the seizure of said tandem trunk by said selector switches, a first impedance bridge for said tandem trunk including a relay, means operative upon the completion of the transmission of impulses through said tandem trunk for operating said relay over the calling line, means controlled by said relay for opening said impulsing circuit at said tandem trunk, a second impedance bridge, condensers, and means controlled by said relay for connecting said second bridge across the outgoing talking conductors of said tandem trunk and for interposing said condensers in said talking conductors between said bridges.

In witness whereof, we hereunto subscribe our names this fourth day of December, 1930.

GEORGE CLIFFORD HARTLEY.
ESMOND PHILIP GOODWIN WRIGHT.